US008212209B2

(12) United States Patent
Bowdler

(10) Patent No.: US 8,212,209 B2
(45) Date of Patent: Jul. 3, 2012

(54) TOF MASS SPECTROMETER FOR STIGMATIC IMAGING AND ASSOCIATED METHOD

(75) Inventor: Andrew Bowdler, Staffordshire (GB)

(73) Assignee: Kratos Analytical Limited, Manchester (GB)

( * ) Notice: Subject to any disclaimer, the term of this patent is extended or adjusted under 35 U.S.C. 154(b) by 48 days.

(21) Appl. No.: 13/054,295

(22) PCT Filed: Jul. 16, 2009

(86) PCT No.: PCT/GB2009/001758

§ 371 (c)(1), (2), (4) Date: Jan. 14, 2011

(87) PCT Pub. No.: WO2010/007373

PCT Pub. Date: Jan. 21, 2010

(65) Prior Publication Data

US 2011/0139973 A1 Jun. 16, 2011

Related U.S. Application Data

(60) Provisional application No. 61/129,772, filed on Jul. 17, 2008.

(30) Foreign Application Priority Data

Jul. 17, 2008 (GB) .................................. 0813135.1

(51) Int. Cl.
*H01J 49/40* (2006.01)
*B01D 59/44* (2006.01)

(52) U.S. Cl. ......................... 250/283; 250/287; 250/281

(58) Field of Classification Search .......... 250/281–283, 250/287

See application file for complete search history.

(56) References Cited

U.S. PATENT DOCUMENTS

2002/0027194 A1* 3/2002 Holle et al. .................. 250/287

(Continued)

FOREIGN PATENT DOCUMENTS

EP 2007-157353 A 6/2007

(Continued)

OTHER PUBLICATIONS

Hazama et al. "Construction of a Novel Stigmatic MALDI Imaging Mass Spectrometer", Applied Surface Science 255, 2008, 1257-1263.*

Hisanao Hazama et al., "Construction of a Novel Stigmatic MALDI Imaging Mass Spectrometer", Applied Surface Science, XP-002559195, 2008, pp. 1257-1263.

(Continued)

*Primary Examiner* — Jack Berman
*Assistant Examiner* — David E Smith
(74) *Attorney, Agent, or Firm* — Squire Sanders (US) LLP

(57) ABSTRACT

The present invention is concerned with improving the focusing of ions having a particular mass to charge ratio by optimising the electric field for the focusing of ions having that particular mass to charge ratio. In particular, the stigmatic focusing of ions can be improved by adjusting a voltage applied to an ion-optical lens 50 for ions of different mass to charge ratios as those ions pass through the lens. In one embodiment, a digital to analogue converter 32 and amplifier 34 are AC coupled to a high voltage DC power supply unit 38 by high voltage capacitor 36. The digital to analogue converter 32 generates a low voltage wave form which is amplified by the amplifier 34 and then added to the output of the high voltage supply 38 so that the desired voltage waveform is generated and applied to ion-optical lens 50 as ions pass through the lens.

19 Claims, 15 Drawing Sheets

U.S. PATENT DOCUMENTS

| | | | | |
|---|---|---|---|---|
| 2004/0256549 | A1 | 12/2004 | Bowdler et al. | |
| 2005/0023459 | A1 | 2/2005 | Colburn et al. | |
| 2009/0314934 | A1 * | 12/2009 | Brown | 250/282 |

FOREIGN PATENT DOCUMENTS

| | | | |
|---|---|---|---|
| GB | 2 361 353 | A | 10/2001 |
| GB | 2 368 715 | A | 5/2002 |
| GB | 2 437 609 | A | 10/2007 |
| JP | 2007-157353 | A | 6/2007 |

OTHER PUBLICATIONS

Bruno W. Schueler, "Microscope Imaging by Time-of-Flight Secondary Ion Mass Spectrometry", Microsc. Microanal. Microstruct. 3, Apr./Jun. 1992, pp. 119-139.

UK Search Report application No. GB0813135.1 dated Nov. 19, 2008.

* cited by examiner

TOF MASS SPECTROMETER FOR STIGMATIC IMAGING AND ASSOCIATED METHOD

This invention relates to TOF ("time-of-flight") mass spectrometers and associated methods. In particular, the present invention relates to TOF mass spectrometers and associated methods for performing imaging of a sample.

TOF mass spectrometry is an analytical technique for measuring the mass to charge ratio of ions by accelerating ions and measuring their time-of-flight to a detector.

Two known methods of TOF mass spectrometry are matrix-assisted laser desorption/ionization TOF mass spectrometry ("MALDI TOF" mass spectrometry) and tandem TOF mass spectrometry ("TOF-MS/MS" mass spectrometry). These methods are used as methods of identifying macro-molecular compounds in biological systems for example.

In MALDI TOF mass spectrometry, a laser pulse is focussed to a small "laser spot" on a mixture of a sample (e.g. biological material) and a light-absorbing matrix so that an ion pulse is produced from the sample. The ion pulse is accelerated away from the sample by a pulsed extraction system whereby a pulsed electric field is applied to the sample in the ion source. The ion pulse is detected and analysed by a time-of-flight mass spectrometer so that the mass to charge ratio of ions from the sample can be measured. The laser, pulsed extraction and the mixture of a sample and a light absorbing matrix may be referred to as a MALDI ion source.

In TOF-MS/MS mass spectrometry, ions undergo fragmentation before they are detected and analysed. The ions may be fragmented by meta-stable decay or by collision induced dissociation for example. TOF-MS/MS is useful because it allows analysis of both precursor ions (non-fragmented ions) and product ions (fragmented ions). TOF-MS/MS mass spectrometry can be used in combination with MALDI TOF mass spectrometry. In other words, a MALDI ion source can be used in a mass spectrometer in which ions undergo fragmentation before they are detected.

It is known to use a MALDI TOF mass spectrometer having a single detector to form an image showing the spatial distribution of compounds having different mass to charge ratios within a sample. This is achieved by moving the sample underneath the laser spot, so that the detector collects multiple spectra, each spectra being collected with the laser spot at a different position on the sample. In this way, an image of the sample is formed with each pixel of the image corresponding to a different position on the sample.

The present inventors have noted that there are two drawbacks to forming an image using a MALDI TOF mass spectrometer by moving the sample. Firstly, the spatial resolution of the image is limited by the size of the laser spot, because the single detector of the MALDI TOF mass spectrometer cannot detect information about the spatial distribution of compounds within the laser spot. Secondly, the speed at which the sample can be imaged is determined by how long it takes the detector to collect a spectrum at each sample position or the time per pixel of the image.

Another method which can be used to form an image of a sample is to use a MALDI TOF mass spectrometer to stigmatically image the sample. This method involves using a pulsed laser to extract ions from a laser spot on a sample and stigmatically focussing the ions onto a spatial detector so that the position of the ions incident on the detector corresponds to the position of the ions on the sample (within the laser spot). The spatial detector (also known as an imaging detector) is able to measure both the time and position of ions incident on it, so that an image can be formed from the stigmatically focussed ions.

It has been found by the inventors that it is difficult or even impossible to obtain a sharp or accurate image because the ion optics in TOF mass spectrometers do not spatially focus all of the ions in an ion pulse. In particular, the present inventors have found that the position of many of the ions incident on the detector in an ion pulse does not correspond to the position on the sample from where the ions were generated. In other words, the present inventors have noted that the spatial focussing of ions in stigmatic imaging systems can be poor, such that, for example, the resultant image does not accurately convey spatial information relating to the sample composition.

In particular, the present inventors have noted that pulsed extraction, which is used in the ion source to improve mass resolution for a particular mass (the optimised mass) by providing time focussing of the ions, causes astigmatism of the images of masses other than the optimised mass. Indeed, the inventors have observed that the degree of astigmatism increases as the mass gets further from the optimised mass.

The present invention aims to provide a TOF mass spectrometer and associated method which address and/or ameliorates some or all of the above mentioned problems. In particular, the present invention is concerned with improving the spatial focussing of an ion pulse in TOF mass spectrometer for sample imaging.

In this connection, it is important to distinguish between focussing ions in time, which affects the peak width and mass resolution and is the aim of the pulsed extraction in the ion source, and focussing ions in space (spatial focussing), which affects the sharpness of an image and is the subject of the present invention. Reference to "focus" or "focussing" herein is a reference to spatial focussing unless stated otherwise.

At its most general, the present invention proposes that an ion pulse can be focused after the pulsed extraction ion source with an electric field, wherein the electric field is adjusted (i.e. changed) as the ion pulse passes through the electric field. The present invention proposes that adjustment of the electric field while the ion pulse is moving through the electric field can focus ions of different mass (strictly, different mass to charge ratio) and thereby reduce astigmatism.

Whilst the term "ion pulse", will be familiar to the skilled reader, it is mentioned for completeness that it means a group of ions generated (extracted) from the sample over a particular period of time. Typically this corresponds to the duration of a single pulse in the pulsed extraction of ions from the sample. For example, the ions may be generated from the sample within a period of one microsecond. A particularly preferred method of generating an ion pulse from a sample is pulsed laser desorption (e.g. MALDI).

According to a first aspect of the invention, there is provided a TOF mass spectrometer according to claim 1.

Thus, suitably the electric field used to focus an ion pulse is adjusted whilst the ion pulse is present in or moving through the electric field.

The present inventors have found that the focussing of any given ion in an ion pulse by an electric field can be improved by optimising the electric field for that particular ion. In particular, the present inventors have found that it is possible to improve the focussing of an ion having a particular mass to charge ratio in an ion pulse by optimising the electric field for that particular mass to charge ratio. In a TOF mass spectrometer, the time-of-flight of an ion in an ion pulse is dependent on mass to charge ratio of that ion. In particular, the time-of-flight of ions to the ion-optical lens (and hence to the electric field provided by the ion-optical lens) in a TOF mass spectrometer is dependent on mass to charge ratio. The present inventors have found that by adjusting (dynamically) an electric field as an ion pulse passes through the electric field, it is possible to optimise the electric field for the focussing of different ions (mass to charge ratio) in the ion pulse as they pass through the electric field at different times. This dynamic focussing of the ions has been found from ion trajectory simulation to reduce astigmatism and improve image sharpness.

Accordingly, the electric field adjusting means is able to adjust the electric field provided by the ion-optical lens whilst an ion pulse is passing through the electric field.

Suitably the ion pulse passes through the ion-optical lens and so suitably the electric field adjusting means adjusts the electric field as the ion pulse passes through the ion-optical lens.

The ion-optical lens is located between the ion source and the spatial detector. Suitably, the ion-optical lens is located on the ion path (ion-optical axis) between the ion source and the spatial detector. In embodiments, the ion-optical lens is located far enough from the ion source to allow the different mass ions to separate sufficiently so that the focussing of one mass doesn't interfere with that of a different mass. Another consideration is that the change in the electric field should occur on a practical time-scale (in other words can be produced by suitable electronics). Suitably the ion-optical lens is located closer to the ion source than to the spatial detector.

In the case where the spectrometer is a TOF-MS/MS, the ion-optical lens is suitably located before the point where the fragmentation takes place (for example the flight tube for meta-stable decay or the collision gas cell for CID). This is because the trajectories of the fragment ions must be essentially the same as the precursor ions in order to maintain the stigmatic image. The energy of a fragment ion depends on the fragment mass (it is the parent energy multiplied by the ratio of the fragment mass to the parent mass) and the effect of the ion-optical lens will therefore be dependent on the fragment mass, even though fragment ions and precursor ions pass through the ion optical lens together.

Thus, in the case where the spectrometer is a TOF-MS/MS it is preferred that the ion-optical lens is located before the fragmentation region. Suitably the fragmentation region is a flight tube or a collision cell.

The ion-optical lens is typically located at least 50 mm, preferably at least 100 mm, more preferably at least 150 mm, from the ion source (suitably from the sample). Closer to the sample requires the speed of adjustment of the ion-optical lens field to be faster and the effective length of the lens to be shorter. Suitably the ion-optical lens is located no more than 400 mm, preferably no more than 300 mm and most preferably no more than 210 mm from the ion source (suitably from the sample). Further from the sample allows slower changes in the ion-optical lens field and a larger lens but, for MS/MS especially, can reduce the efficiency of the ion optics (affecting sensitivity for example). Preferably the ion-optical lens is located in the range of 50 mm to 400 mm, more preferably in the range 100 mm to 300 mm and most preferably in the range 150 to 210 mm, from the ion source (suitably from the sample). A particularly preferred position is about 180 mm from the ion source (suitably from the sample).

The spatial detector may be a linear spatial detector (e.g. for linear TOF-MS imaging). A linear detector is a detector located parallel to the ion-optical axis of the mass spectrometer. Typically a linear detector is located on the ion-optical axis, but a linear detector could be offset from the ion-optical axis.

The spatial detector may be a reflectron spatial detector (e.g. for reflectron TOF-MS imaging). A reflectron detector is located so as to detect ions in an ion pulse that have been reflected (e.g. by an ion mirror or reflectron).

The spatial detector suitably comprises means for measuring the position of ions incident on the detector. The detected ion locations may be used to form an image of the sample. The spatial detector may therefore also be referred to as an imaging detector.

Suitably the spatial detector measures the position of the ions in the x- and y-direction. Suitably the image formed from such measurements is a 2-D image.

Suitably, the spectrometer includes processing means for determining the TOF and spatial distribution based on the time and location of detected ions. Suitably the processing means is capable of generating an image based on the measured values. Typically the TOF and spatial distribution are determined with electronics attached to the output(s) of the detector.

The TOF mass spectrometer of the first aspect is therefore adapted to optimise the focus of an ion pulse for detection by a spatial detector. In particular, embodiments improve the sharpness of the image formed by the spatial detector. The improved focussing (low astigmatism) achieved by embodiments of the present invention is of great benefit where accurate imaging of samples is required.

The sharpness of an image formed by a spatial detector may depend on the spatial resolution of the detector. In particular, the number of "pixels" the spatial detector has and/or the "pixel density" (number of pixels per unit area) may affect spatial resolution of the detector. In this context, a "pixel" is a discrete location on the detector at which ions can be detected and their location distinguished from ions detected at other discrete locations on the detector.

The spatial detector may be a delay line detector. The delay line detector may include two or more wires. Suitably the each wire is arranged to provide detection in either the x- or y-direction. For example, in the case of a delay line detector having two sets of wires, a spectrum could be acquired at the four ends of the two wires. The spatial resolution of a delay line detector is determined by the number of turns of the delay line wire along each axis. Typically, a delay line detector will have a few tens of turns so that, with two axes, a few hundred pixels can be acquired simultaneously (suitably using only the four transient recorders).

The spatial detector may have multiple anodes. This can be achieved, for example, with segmented anodes. A multiple anode detector may have only a small number of pixels compared with a delay line detector, because of the need to acquire a spectrum simultaneously from each anode.

Preferably the lateral spatial distribution is focused by the action of the electric field adjusting means, suitably so that improved lateral spatial distribution is achieved at the detector. That is, the spatial distribution in the plane normal to the direction of ion pulse travel, i.e. normal to the axial direction and in the plane of the sample surface, is focused. Thus, in embodiments the position of the ions in the x- and y-directions as measured by the spatial detector results in a sharper image.

The performance of the ion-optical lens should be appropriate to the spatial detector used, and vice versa. For example, if a spatial detector having a large number of pixels is used (e.g. a delay line detector) then the ion-optical lens must provide correspondingly low levels of astigmatism so that a good sharp image can be obtained.

The spatial detector is suitably a TOF detector, capable of measuring the time-of-flight of ions incident on the detector.

The electric field adjusting means suitably adjusts the strength of the electric field (i.e. alters the strength of the electric field) as the ion pulse passes through the electric field. Suitably adjusting the strength of the electric field includes increasing the strength of the electric field. Additionally or alternatively the shape and/or size of the electric field is changed.

Preferably the electric field is provided by the ion-optical lens by applying a voltage to the ion-optical lens. Suitably the electric field adjusting means provides such a voltage. Preferably the electric field adjusting means provides a variable voltage to the ion-optical lens (thereby causing variation in the electric field provided by the ion-optical lens).

The electric field adjusting means preferably includes a voltage waveform generator for applying a voltage waveform to the ion-optical lens as the ion pulse passes through the electric field provided by the ion-optical lens. In this way, the electric field provided by the ion-optical lens can be controlled by the applied voltage waveform. Thus, suitably the electric field adjusting means is adapted to apply a voltage waveform to the ion-optical lens to adjust the electric field. By "voltage waveform" it is meant a voltage that changes over time (but it need not change continuously).

Suitably, the voltage waveform generator can produce any type of voltage waveform. For example, the voltage waveform may be a linear, exponential, stepped (i.e. increasing and/or decreasing in steps) or oscillating waveform. A linear waveform, and in particular an increasing linear waveform (a "ramp"), has been found to be particularly effective in achieving an improved focus with reduced astigmatism.

The TOF mass spectrometer, and preferably the electric field adjusting means, may include a control means for controlling the voltage waveform generator. The control means may be a processing unit, for example. The control means may be a computer. The control means preferably controls the voltage waveform generator to improve the focussing of ions by the ion-optical lens, thereby suitably reducing astigmatism.

The present inventors have found that better focussing of ions in an ion pulse by the ion-optical lens can be achieved by applying a larger voltage to the ion-optical lens for ions of larger mass to charge ratio than for ions of smaller mass to charge ratio. Accordingly, by increasing the voltage applied to the ion-optical lens by the voltage waveform generator as the ion pulse passes through the electric field, improved focussing of ions by the ion-optical lens can be achieved. The electric field adjusting means is suitably adapted to control the magnitude of the voltage applied to the ion-optical lens by the voltage waveform generator as the ion pulse passes through the electric field. Suitably, the electric field adjusting means is adapted to increase the voltage (i.e. the magnitude of the voltage) as the ion pulse passes through the electric field. This is particularly effective because the time-of-flight of ions to the ion-optical lens increases with the mass to charge ratio of the ions. Therefore, increasing the voltage applied to the ion-optical lens as the ion pulse passes through the electric field has the effect of applying a larger voltage to ions having a larger mass to charge ratio (and a smaller voltage to ions having a smaller mass to charge ratio). The function of controlling the magnitude of the voltage, and in particular increasing the voltage may be provided by the control means.

Suitably the magnitude of the voltage is controlled so as to provide an increase of 1-50%, preferably 1-20% and more preferably 1-10%. Naturally, the extent of the change in magnitude depends on the range of mass to charge ratios that are to be detected. For example, a voltage of 5200V may be applied to the ion-optical lens in order to focus the spatial distribution of ions having a mass to charge ration of 1050 Da, whereas a voltage of 5540V may be applied to the ion-optical lens in order to focus the spatial distribution of ions having a mass to charge ratio of 2450 Da. Suitably the voltage applied to the ion-optical lens varies (preferably increases) in the range 4500-6000V, preferably in the range 4750-5750V, and most preferably in the range 5000-5600V.

Suitably, the voltage waveform generator can produce a voltage of at least 1000 Volts, more preferably at least 3000 Volts, more preferably at least 5000 Volts.

The control means may include a memory for storing one or more voltage waveforms to be applied to the lens by the voltage waveform generator. The voltage waveform generator may have means for retrieving (or be arranged to retrieve) a voltage waveform from the memory (e.g. so that the control means could apply the retrieved voltage waveform to the lens). The stored voltage waveform(s) could, for example, have been arrived at by a calibration method for a mass spectrometer. Such a calibration method is described in more detail below.

The control means may include a calculating means for calculating a voltage waveform to be applied to the lens by the voltage waveform generator.

A voltage waveform may be calculated, for example by the calculating means, on the basis of a calculated time-of-flight of ions to the ion-optical lens. For example, the time of flight, $T_{tof}$ (in a field-free region) for ions of mass to charge ratio m/z, can be given by:

$$T_{tof}=L(m/2\ \mathrm{zeV})^{1/2}$$

where L is the distance from the ion source and V is the nominal energy gained by the ions in the ion source. This equation can be used to calculate a voltage waveform. As can be seen from the above equation, the time-of-flight of an ion to the ion-optical lens is longer for ions having larger mass to charge ratios.

A voltage waveform may additionally or alternatively be calculated on the basis of ion trajectory simulations, e.g. using SIMION™ 8 ion trajectory modelling software.

The control means may be coupled to the ion source. Suitably, the control means is coupled to the ion source so that control of the voltage waveform is dependent at least in part on one or more properties of the ion source. For example, the control means may be coupled to the ion source so that the voltage waveform is applied to the ion-optical lens a predetermined time after generation of the ion pulse (e.g. time of pulsed extraction).

Coupling the control means to the ion source is advantageous because the time-of-flight of ions to the ion-optical lens may vary with respect to the properties or configuration of the ion source. Therefore, by adjusting the voltage waveform applied to the ion-optical lens so that control of the voltage waveform is dependent at least in part on one or more properties of the ion source, it is suitably possible to achieve optimal focussing (reduced astigmatism) according to those properties.

The electric field adjusting means may be arranged to adjust the electric field provided by the ion-optical lens over a short timescale, e.g. less than 10 μs, preferably less than 5 μs and more preferably less than 1 μs. This is because an ion pulse typically passes through the lens very quickly, e.g. over the course of a few microseconds. Accordingly, the voltage waveform generator described above, is suitably arranged to produce a voltage waveform of corresponding duration (e.g. less than 100 μs, preferably less than 10 μs).

The electric field adjusting means (suitably the voltage waveform generator) may include a high voltage switch. The high voltage switch may be arranged to generate a voltage waveform. The voltage waveform generated by the high voltage switch could be applied to the ion-optical lens, it could be applied to the lens directly or via passive components, for example. Suitably the high voltage switch is adapted to apply a high voltage (suitably comprising the voltage waveform) to the ion-optical lens in less than 50 μs, preferably less than 10 μs, and most preferably less than 5 μs.

The electric field adjusting means (suitably the voltage waveform generator) may include a digital to analogue converter. The digital to analogue converter may be arranged to generate a voltage waveform. The voltage waveform generated by the digital to analogue converter may be an intermediate voltage waveform that is amplified before it is applied to the ion-optical lens. Using a digital to analogue converter to generate a voltage waveform is advantageous because a digital to analogue converter can use digital signals to generate a voltage waveform of any desired shape (which may be difficult to achieve with solely analogue components).

Alternatively or additionally the electric field adjusting means (suitably the voltage waveform generator) may include a circuit that produces a voltage (or current) with a time dependent rise or fall in amplitude. A preferred circuit is an RC circuit (a circuit comprising a resistor and/or a capacitor). The RC circuit may be passive. The RC circuit may be arranged to generate a voltage waveform. The voltage waveform generated by the RC circuit may be an intermediate voltage waveform that is amplified before it is applied to the lens by the voltage waveform generator.

The electric field adjusting means (suitably the voltage waveform generator) may include an amplifier. The amplifier may be for amplifying (or arranged to amplify) an intermediate voltage waveform, e.g. from an intermediate voltage waveform generator which may include the digital to analogue converter or RC circuit described above. This arrangement is convenient because it can be easier to generate an intermediate waveform of desired shape (at a low voltage) and then amplify the intermediate waveform to a higher voltage, rather than producing a voltage waveform of a desired shape at a high voltage. For example, a voltage of over 5000V may be required to focus an ion beam but it is easier to provide the voltage waveform at much lower voltages.

The amplifier may include a capacitor and a DC power supply. The capacitor may be for AC coupling an intermediate voltage waveform generator to the DC power supply. AC coupling has previously been used in other roles in a mass spectrometer (e.g. for generating an extraction pulse) and has proved to be a reliable method.

The TOF mass spectrometer may include any suitable ion optic component, an ion optic component being a component for interacting with an ion pulse. An example of an ion optic component is a deflector. One or more of the ion optic components may include an aperture for an ion pulse to pass through. The aperture of an ion optic component may be larger than the size of the ion pulse which passes therethrough when the mass spectrometer is in use. The ratio of the width of the aperture to the width of the ion pulse (i.e. the size of the ion pulse in a direction perpendicular to motion of the ion pulse) when the mass spectrometer is in use may be at least 5:1, more preferably at least 7:1, more preferably at least 10:1. Large ratios such as these have been found to lead to a reduction in astigmatism in the focussing of an ion pulse by a mass spectrometer.

The ion-optical lens may be an einzel lens. An einzel lens is a particularly suitable lens for focussing an ion pulse.

The ion source may be arranged to generate an ion pulse from the sample by any appropriate mechanism, e.g. by being released, desorbed and/or ionised. The ion source suitably includes a pulsed laser. The ion source is preferably a MALDI (matrix-assisted laser desorption/ionization) ion source. The ion source may be a laser desorption ion source (i.e. without matrix). The ion source may also be a SIMS (secondary ion mass spectrometry) ion source. However, regardless of how the ions are generated, the ion source is a pulsed extraction ion source, i.e. includes a pulsed extraction lens.

The TOF mass spectrometer may include a reflectron. A reflectron may be for correcting the kinetic energy distribution of the ion pulse and/or to extend the time-of-flight of ions to the lens and/or detector. One advantage of using a reflectron is that it produces higher mass resolution than a linear TOF mass spectrometer (and therefore better mass accuracy), albeit with a lower maximum mass range. A further advantage of using a reflectron is that it can be used for TOF MS/MS mass spectrometry (in which ions are fragmented, see below).

The TOF mass spectrometer may be a TOF MS/MS mass spectrometer (also known as a tandem mass spectrometer). A TOF MS/MS mass spectrometer suitably includes a fragmentation region for fragmenting ions in an ion pulse. The fragmentation region may be for fragmenting the ions by metastable decay or by collision induced dissociation, for example. The fragmentation region may include a collision cell for collision induced fragmentation of ions. Alternatively or additionally the fragmentation region may include a flight tube. A TOF MS/MS enables analysis of product ions (fragmented ions) and/or precursor ions (non-fragmented ions).

However, the TOF mass spectrometer is not an MS/MS mass spectrometer in some embodiments.

The adjusting of the electric field as the ion pulse passes through the electric field may be such that a first electric field is provided by the lens for a first ion in the ion pulse and then a second electric field is provided by the lens for a second ion in the ion pulse. The adjusting of the electric field may further be such that a third electric field is provided by the lens for a third ion in the ion pulse. In embodiments, a fourth electric field is then provided for a fourth ion. Potentially, a different electric field may be provided for any number of ions in the ion pulse.

The ions in the ion pulse typically have different mass to charge ratios. In particular, the second ion may have a larger mass to charge ratio than the first ion, the third ion may have a larger mass to charge ratio than the second ion and so on. As a consequence, the second ion will arrive at the ion-optical lens after the first ion. The third ion after the second, and so on. Typically there will be a plurality of ions for each mass to charge ratio. In order to optimise the "dynamic" focusing of the ions, suitably the second electric field has a different strength and/or shape than the first electric field. The strength of the electric field provided by the may be increased as the ions pass through the electric field, e.g. so that the second electric field has a higher strength than the first electric field and so on. In this way, a stronger electric field can be provided for ions of higher mass to charge ratios. As explained above, the inventors have found that this improves the stigmatic imaging of ions.

According to a second aspect of the invention, there is provided a method of spatially focussing an ion pulse in a TOF mass spectrometer, the method including: generating an ion pulse from a sample; providing an electric field to spatially focus the ion pulse; and detecting the ion pulse focussed by the electric field, wherein the electric field is adjusted as the ion pulse passes through the electric field.

The method of the second aspect may be implemented on the TOF mass spectrometer of the first aspect. The method may include any one or more of the method steps associated with the TOF mass spectrometer of the first aspect. The advantages of these method steps correspond to the advantages of the TOF mass spectrometer of the first aspect.

Suitably the method includes the step of forming an image of the sample.

Thus, the present invention provides an improved method of stigmatic imaging, wherein "dynamic" spatial focussing is used to reduce or minimise astigmatism.

According to a third aspect, there is provided a TOF mass spectrometer having: a pulsed extraction ion source for generating an ion pulse from a sample; an ion-optical lens for focussing the ion pulse as the ion pulse passes through the ion-optical lens; a spatial detector for detecting the ion pulse focussed by the ion-optical lens; and a voltage waveform generator for applying a voltage waveform to the ion-optical lens as the ion pulse passes through the ion-optical lens.

The TOF mass spectrometer of the third aspect may have any one or more of the features associated with the TOF mass spectrometer of the first aspect. In particular, the voltage waveform generator may have any one or more of the features associated with the voltage waveform generator described in connection with the first aspect.

The method of the second aspect may be carried out on the TOF mass spectrometer of the third aspect.

According to a fourth aspect of the invention, there is provided an electric field adjusting means for use with an ion-optical lens in a TOF mass spectrometer to adjust the electric field provided by the ion-optical lens as an ion pulse passes through the ion-optical lens. The electric field adjusting means may have any one or more of the features of the electric field adjusting means of the first and third aspects.

According to a fifth aspect of the invention, there is provided a method of retrofitting and/or modifying a TOF mass spectrometer to be a TOF mass spectrometer according to the first aspect (or third aspect). The method suitably includes installing an electric field adjusting means according to the fourth aspect.

According to a sixth aspect of the invention, there is provided a method of calibrating a TOF mass spectrometer which includes identifying a voltage waveform to be applied to an ion-optical lens of the TOF mass spectrometer as an ion pulse passes through the ion-optical lens to spatially focus ions in the ion pulse. The method may be used on a TOF mass spectrometer according to the first aspect (or third aspect).

The method may include a step of storing the voltage waveform in a memory (e.g. the memory of the control means described above).

Identifying the voltage waveform may include a step of identifying a voltage which, when applied to the ion-optical lens, achieves satisfactory focussing of ions having a particular mass to charge. A plurality of such voltages may be identified for ions of different mass to charge ratios. The identified voltage waveform may be based on the plurality of voltages. Each of the plurality of voltages could be identified by adjusting a voltage applied to the ion-optical lens (e.g. through the control means applied above) whilst monitoring the sharpness of an image formed by ions of a particular mass to charge ratio formed by the spatial detector.

According to a seventh aspect of the invention, there is provided a use of a variable electric field to spatially focus ions in an ion pulse in a TOF mass spectrometer.

All of the optional and/or preferred features of any one aspect of this invention may be applied to any one of the other aspects. Any one aspect of this invention may be combined with any one or more of the other aspects.

Embodiments and experiments relating to our proposals are discussed below, with reference to the accompanying drawings in which:

FIG. 1 is a schematic diagram of part of a TOF mass spectrometer;

FIGS. 2*a-c* show the simulated trajectories of ions in a TOF mass spectrometer;

Figure 5A:
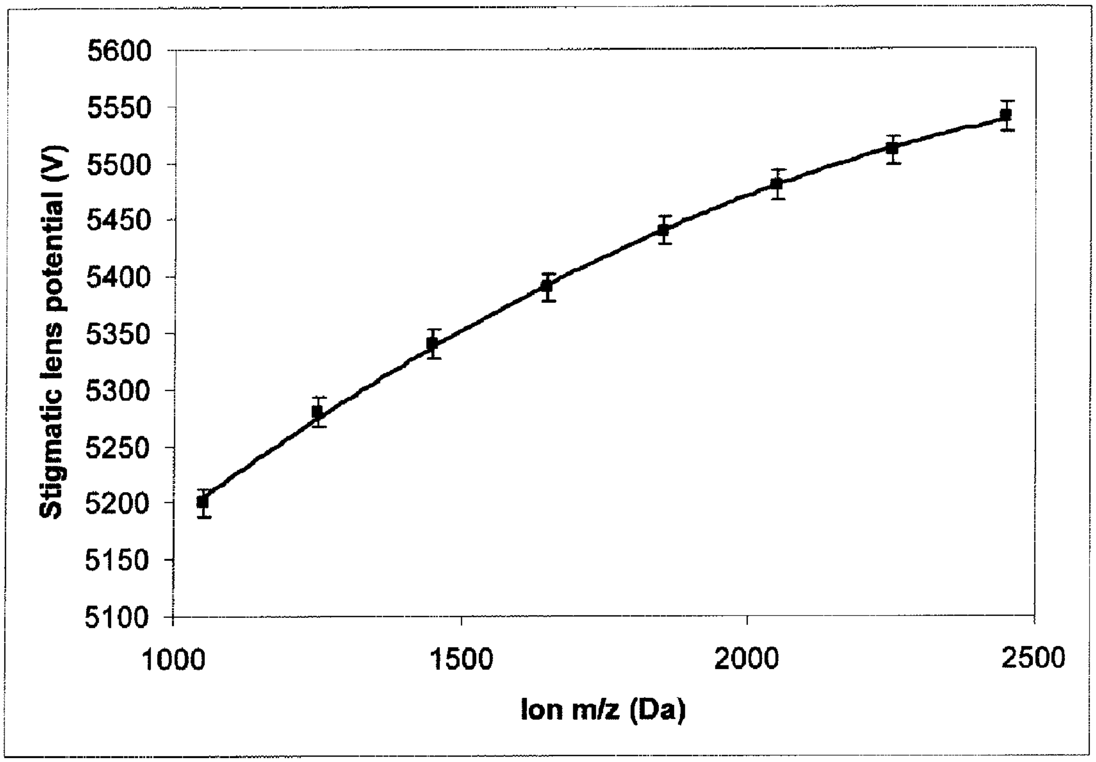
Figure 5B:
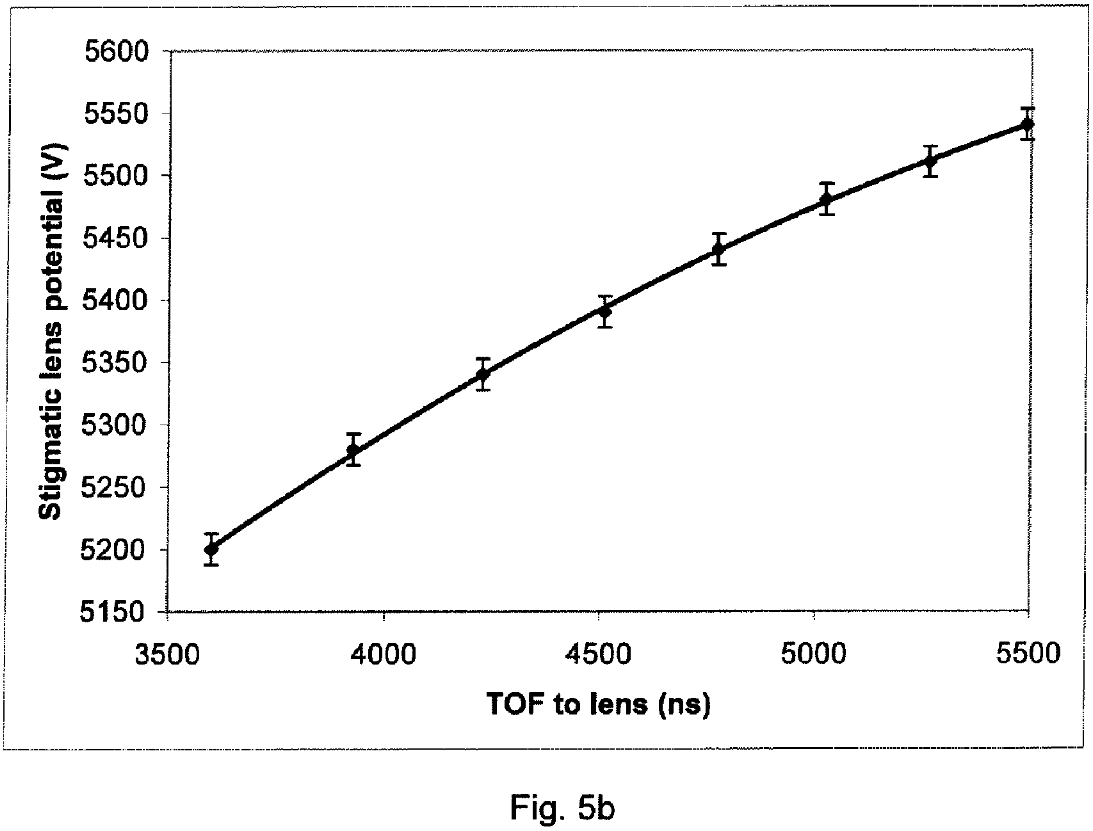
Figure 6:
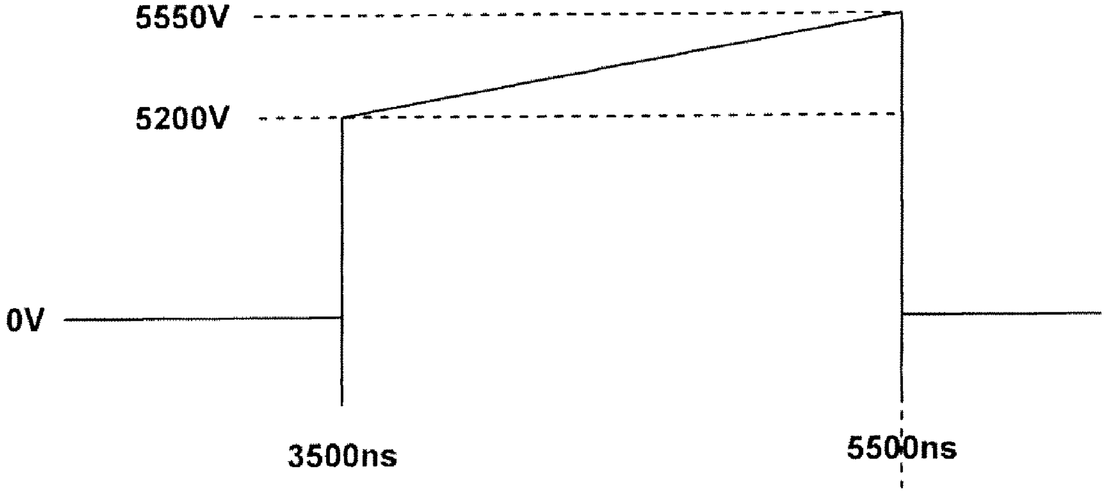
Figure 7:
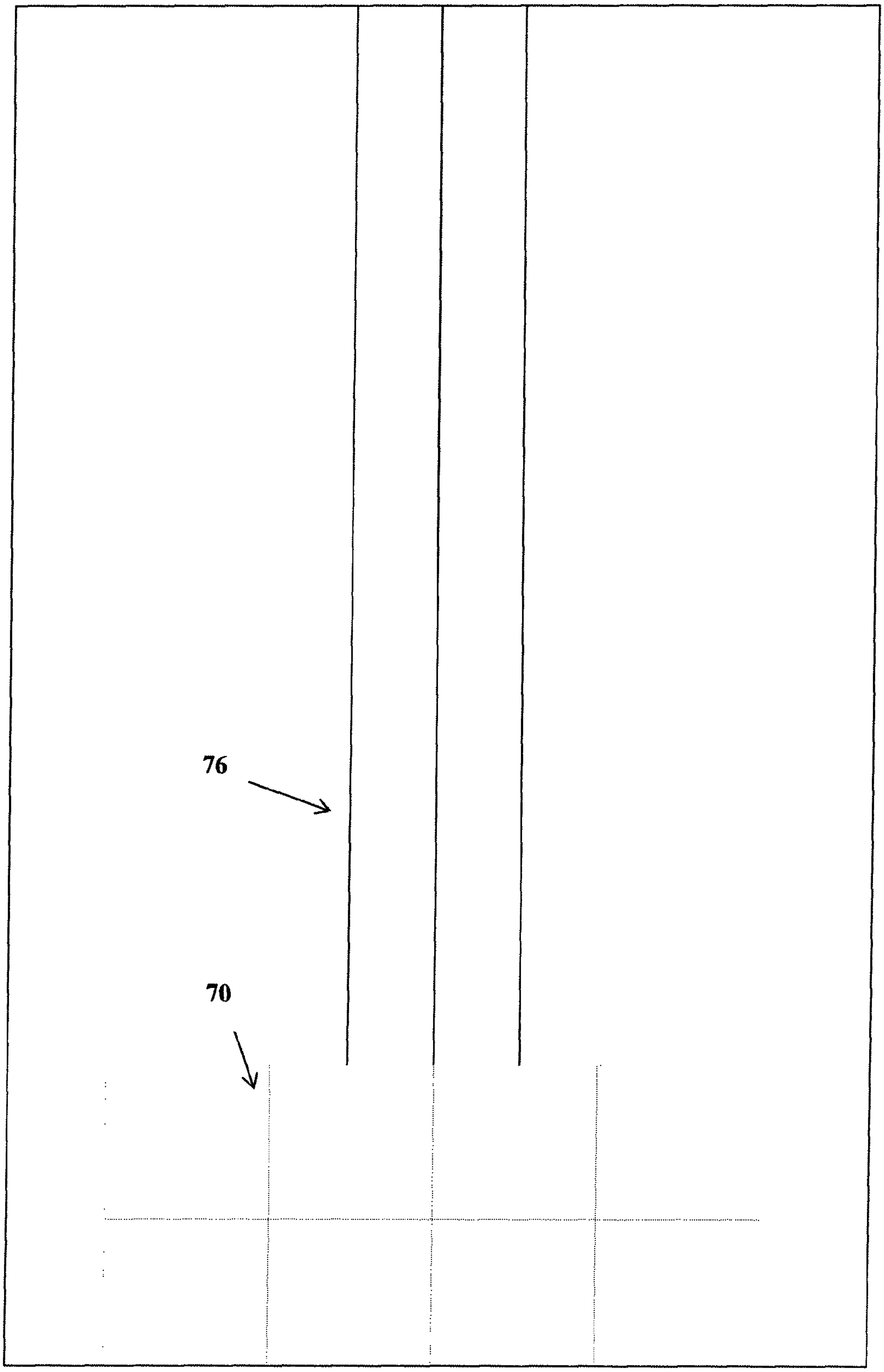
Figure 8:
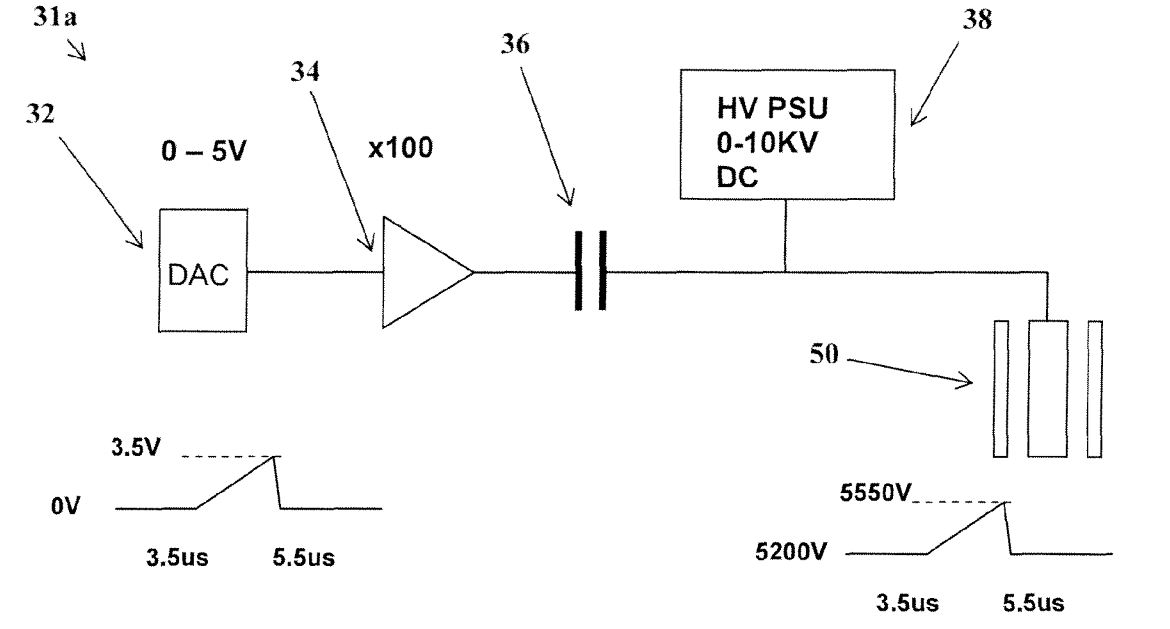
Figure 9:
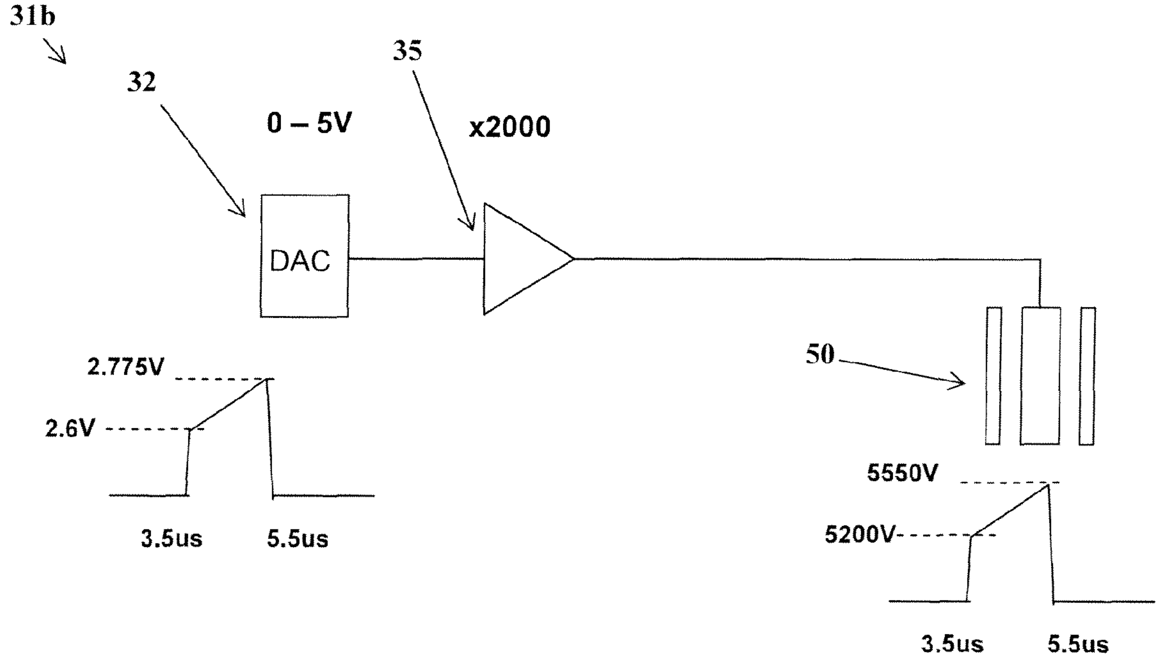
Figure 10:
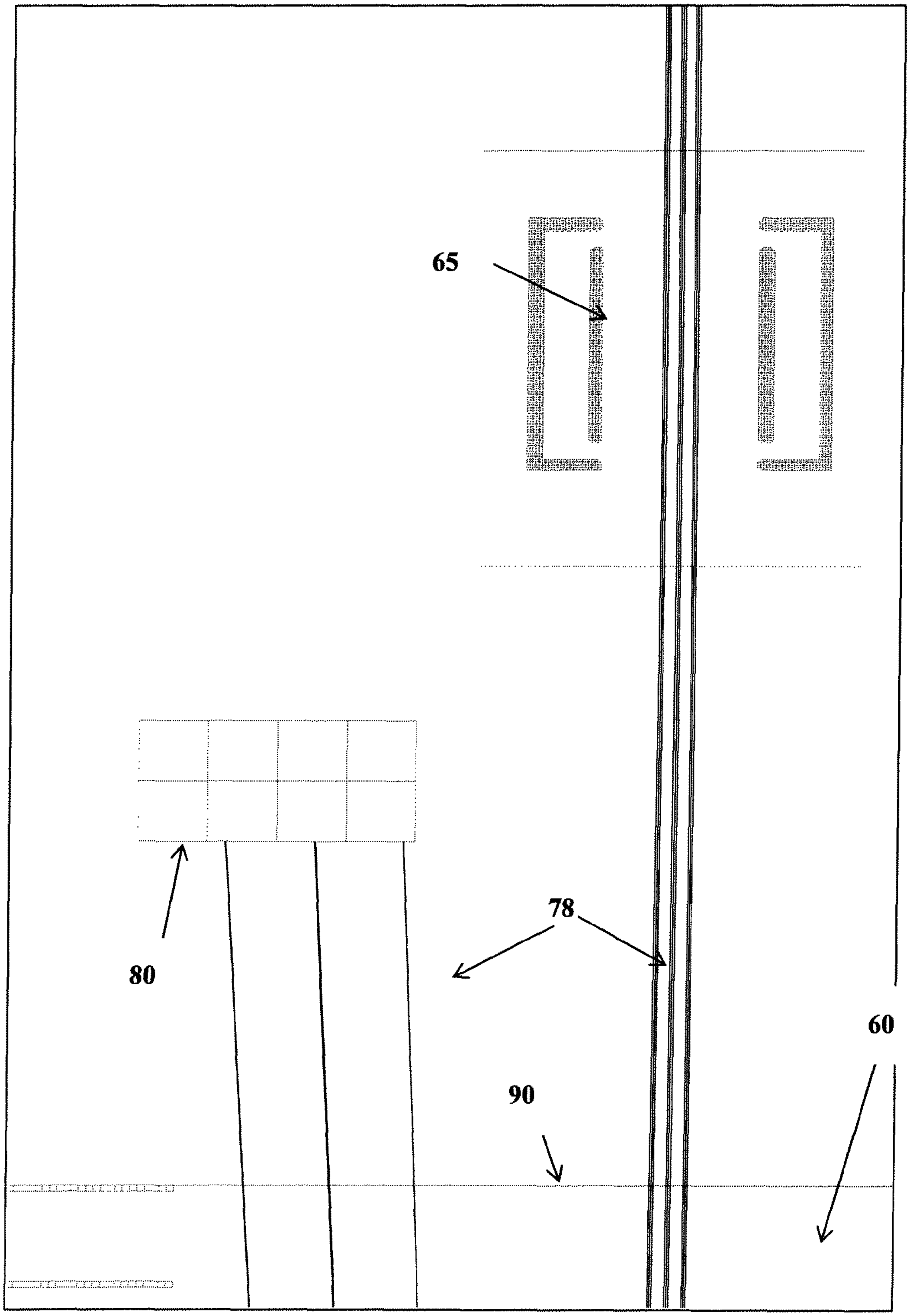
Figure 11:
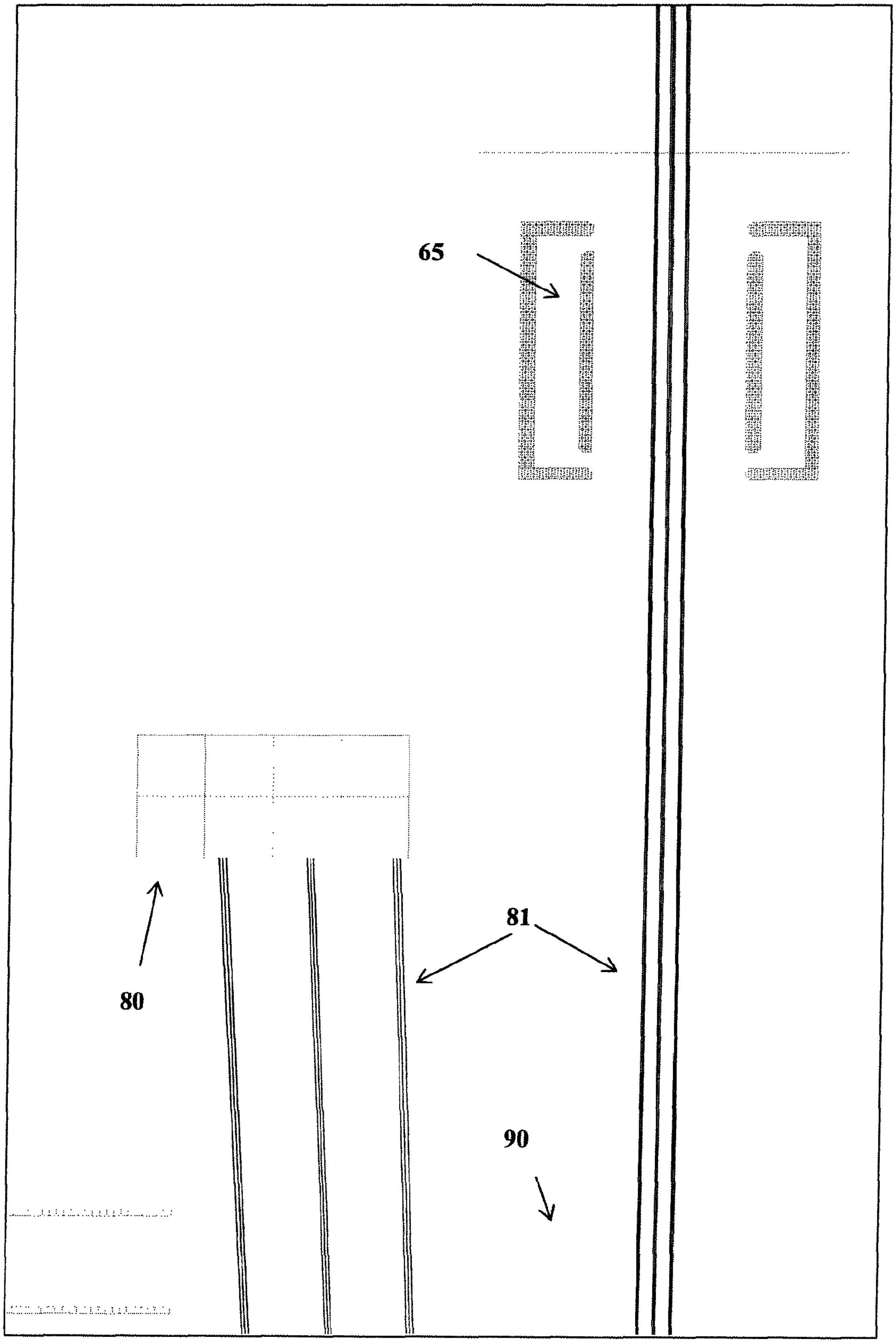
Figure 12:
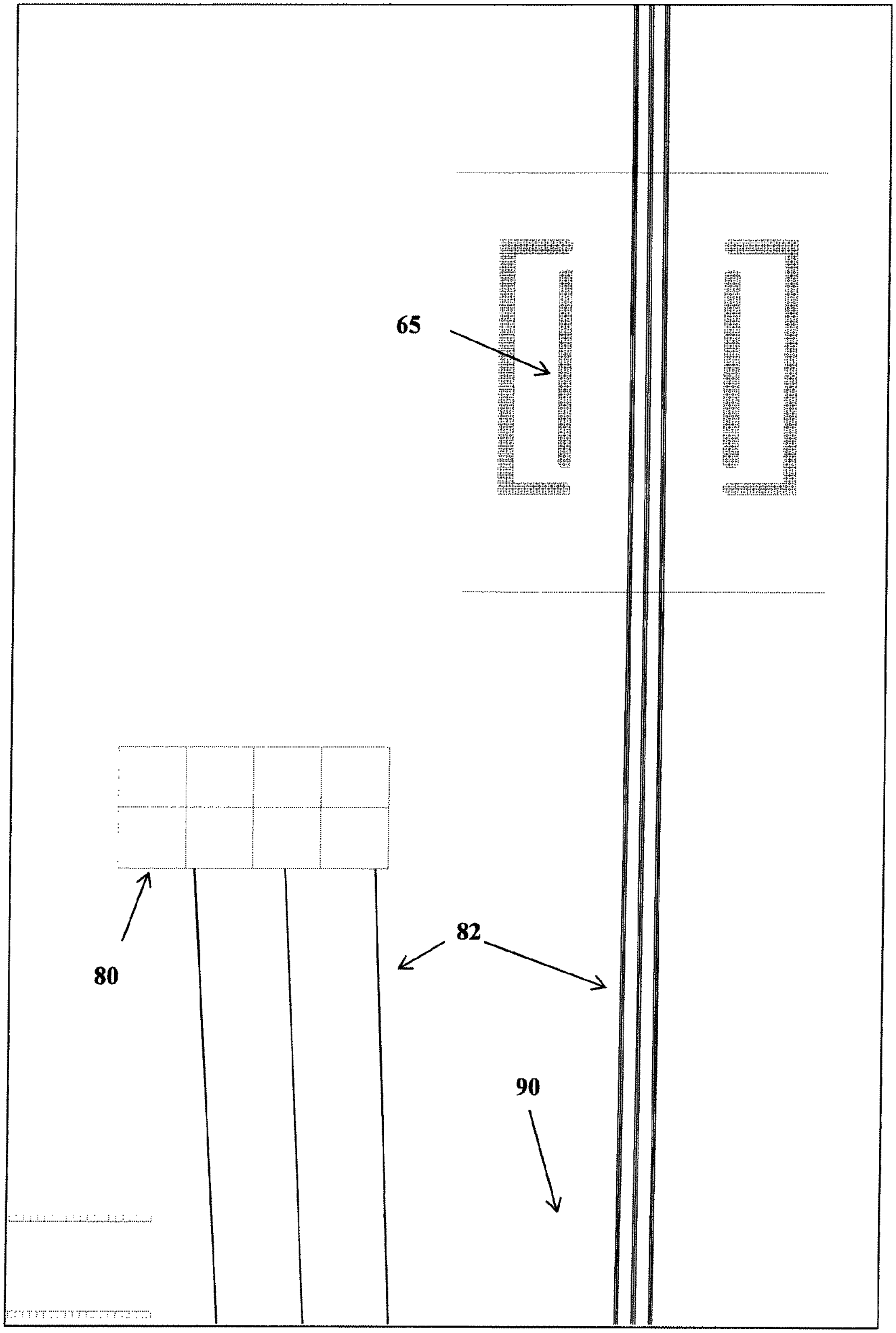
Figure 13:
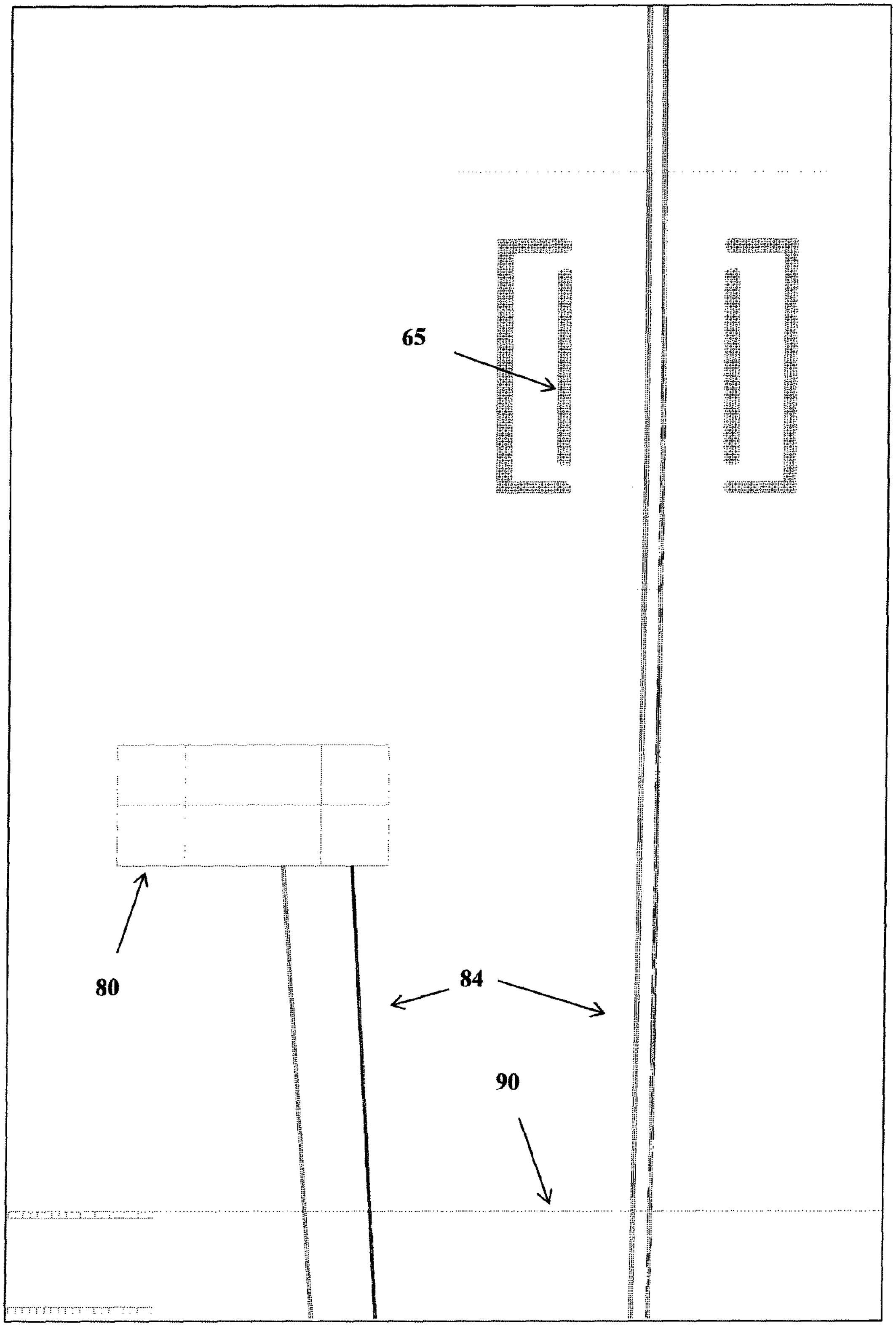
Figure 14A:
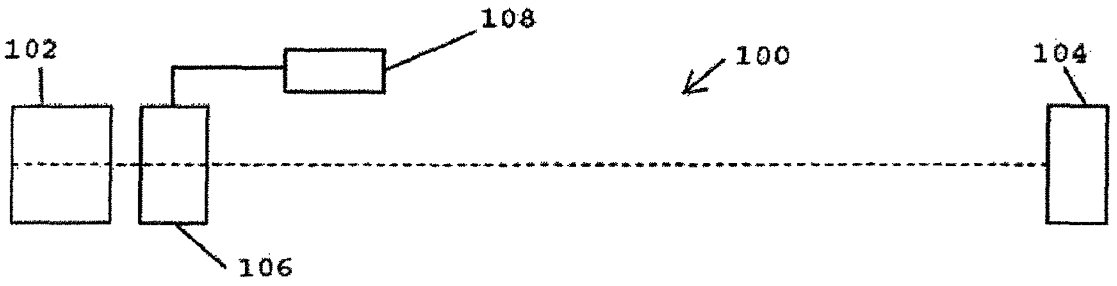
Figure 14B:
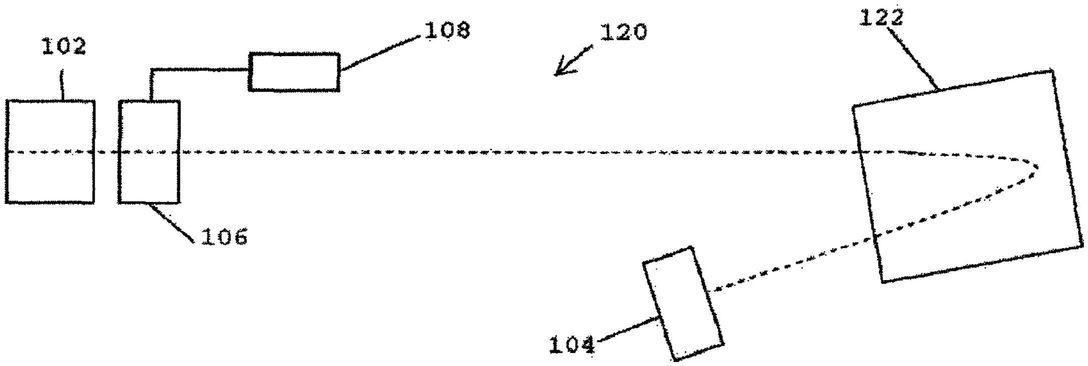
Figure 14C:
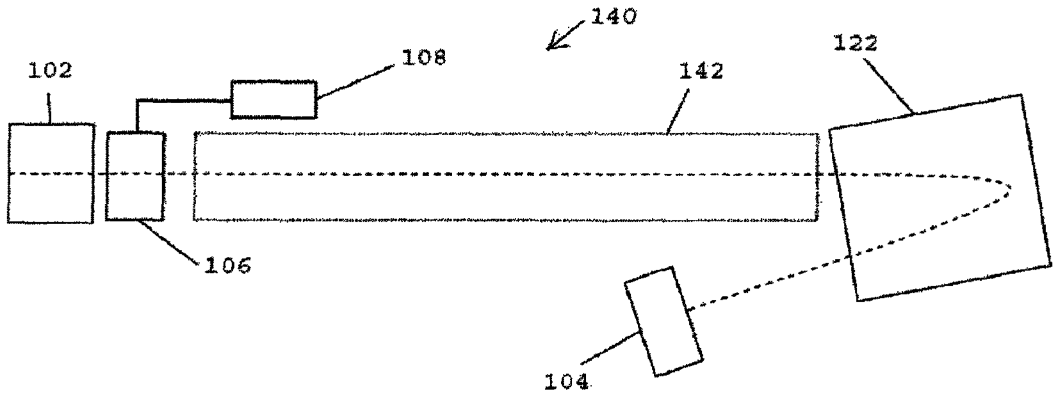

FIG. 5*a* is a graph comparing optimal focussing voltage (V) with the mass to charge ratio of ions;

FIG. 5*b* is a graph comparing optimal focussing voltage (V) with the time-of-flight to lens of ions (ns);

FIG. 6 shows a voltage waveform for applying a focussing lens;

FIG. 7 shows the simulated trajectories of ions of mass to charge ratio 1050 Da incident on a linear detector in a TOF mass spectrometer;

FIG. 8 shows a voltage waveform generator for applying a voltage waveform to a focussing lens;

FIG. 9 shows another voltage waveform generator for applying a voltage waveform to a focussing lens;

FIG. 10 shows the simulated trajectories of ions of mass to charge ratio 1800 Da incident on a reflectron detector in a TOF mass spectrometer;

FIG. 11 shows the simulated trajectories of ions of mass to charge ratio 1050 Da incident on a reflectron detector in a TOF mass spectrometer;

FIG. 12 shows the simulated trajectories of ions of mass to charge ratio 1050 Da incident on a reflectron detector in a TOF mass spectrometer;

FIG. 13 shows the simulated trajectories of fragmented ions of mass to charge ratio 525 Da incident on a reflectron detector in a TOF mass spectrometer; and FIGS. 14*a* to 14*c* show schematically a number of imaging TOF mass spectrometers, being embodiments of the present invention.

All mass to charge ratios quoted herein are provided in units of Daltons for singly charged ions.

Figure 1:
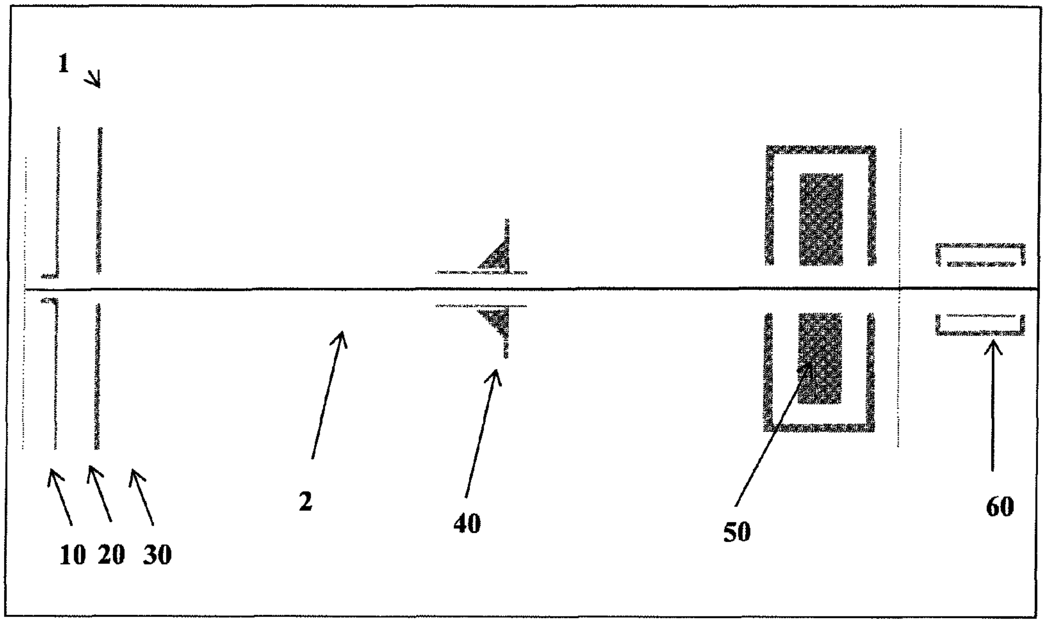

FIG. 1 shows (part of) a TOF mass spectrometer 1 having a sample 10, an extraction lens 20, an exit aperture 30, a prism assembly 40, an ion-optical (spatial focussing) lens 50 and deflectors 60. The mass spectrometer 1 has an ion-optical axis 2, which is illustrated in FIG. 1 by a dark line through the centre of the ion optic components 10, 20, 30, 40, 50 and 60. The mass spectrometer also includes a spatial detector (not shown) located after the deflectors 60 along the ion-optical axis.

In use, the laser pulse is directed to the sample 10 by the prism assembly 40. The ion pulse generated from the sample is extracted, after a suitable delay (typically greater than 100 ns and less than 1 ms) by a pulsed electrostatic field through the extraction lens 20 and the exit aperture 30. After being spatially focussed by the ion-optical lens 50, any minor trajectory corrections are made with the deflectors 60 and the ion pulse continues into the TOF mass spectrometer.

The ion optic components 10, 20, 30, 40, 50, 60 have apertures which are much larger than the diameter of the ion pulses which pass therethrough when the mass spectrometer 1 is in use. Such large apertures have been found to be particularly suited to stigmatic imaging of ions.

Figure 2A:
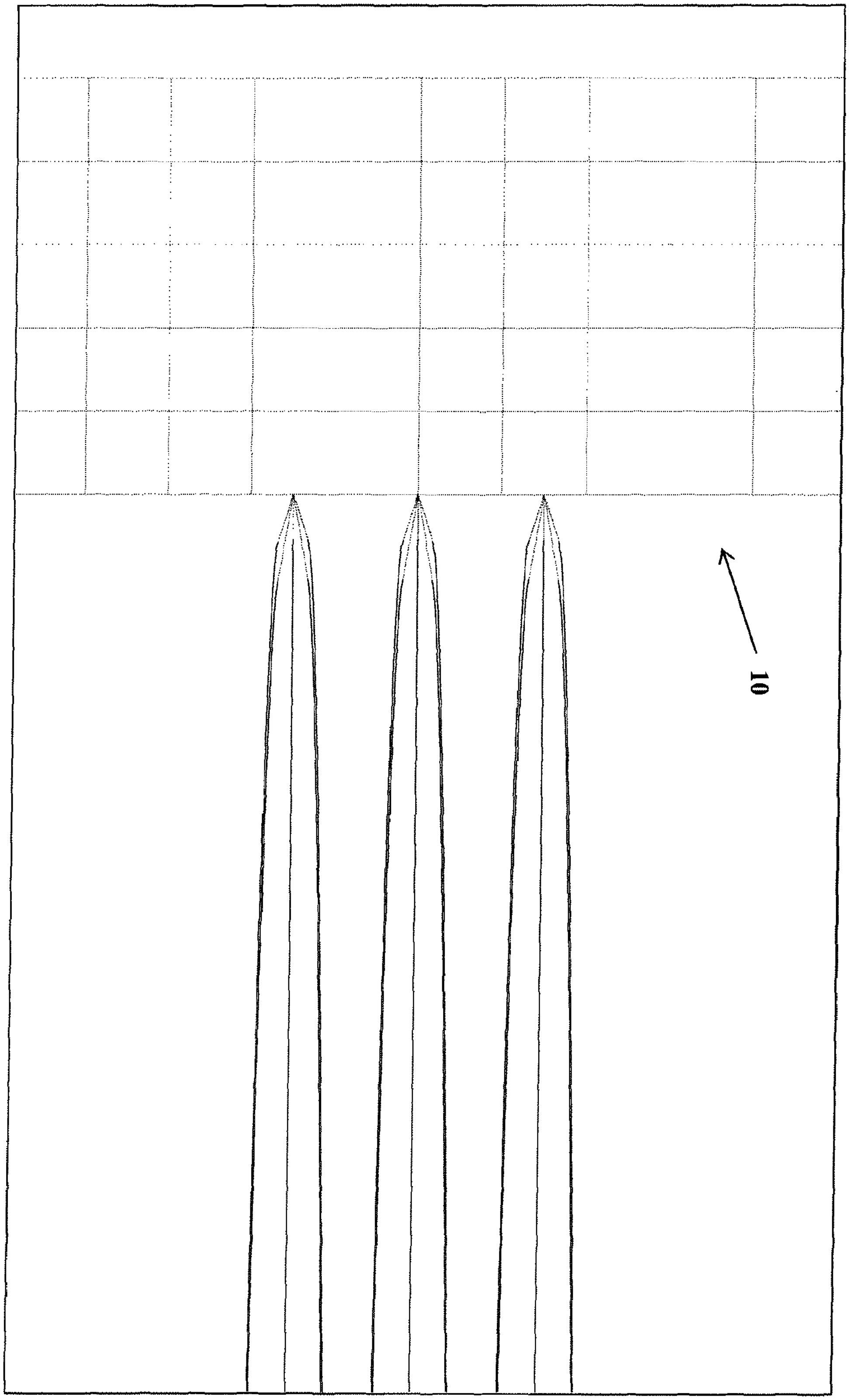
Figure 2B:
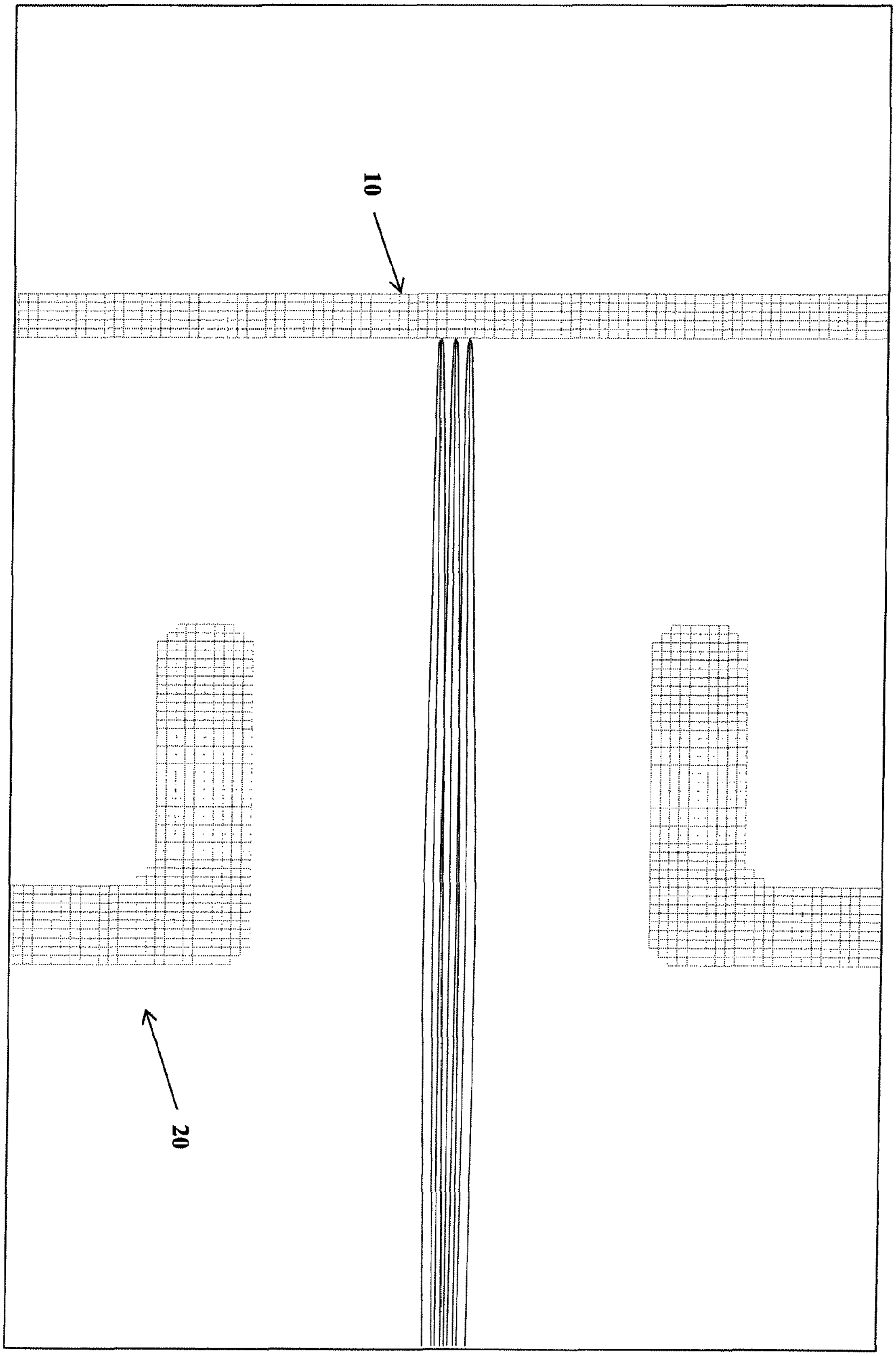
Figure 2C:
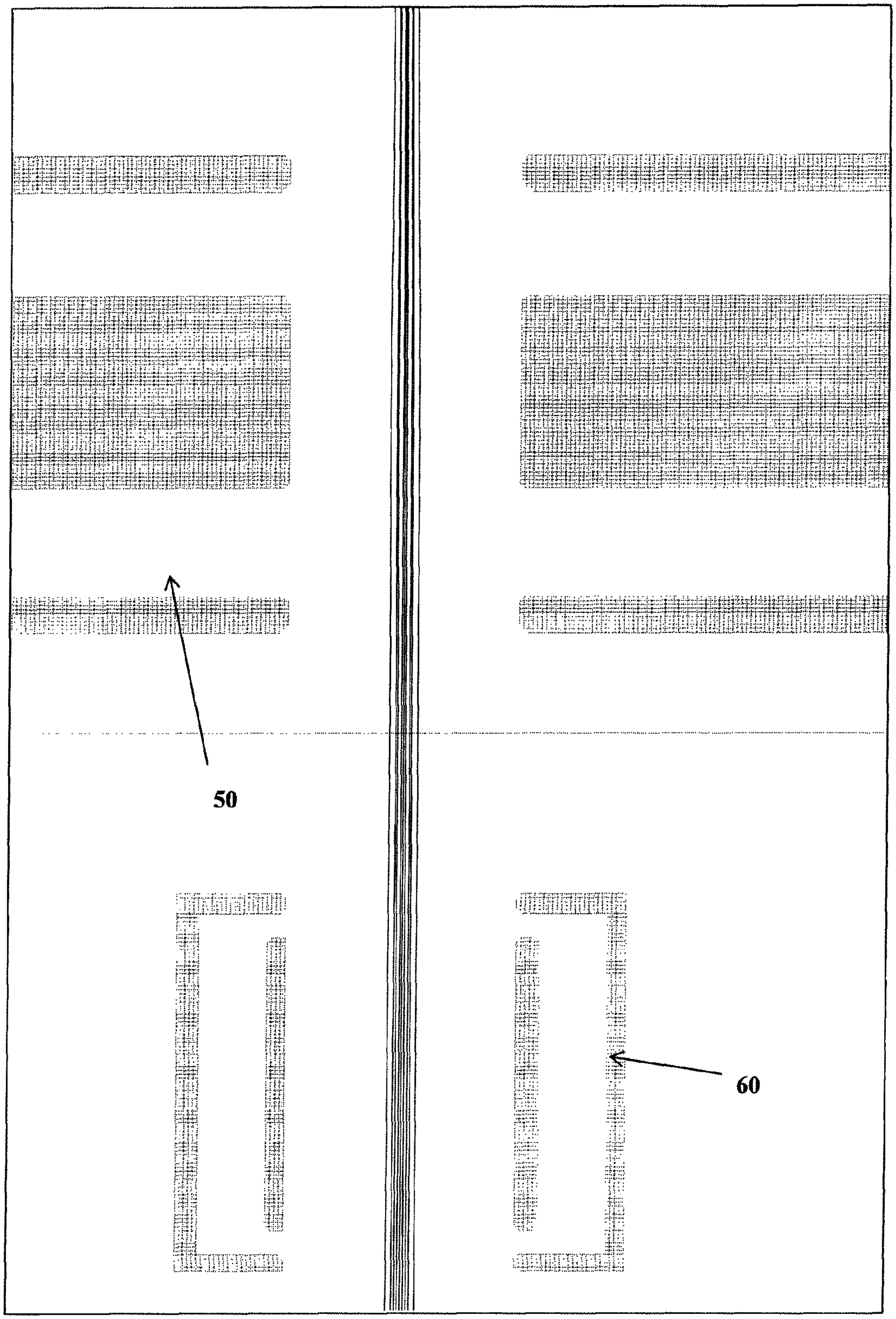

FIGS. 2*a-c* show the simulated trajectories of ions in the mass spectrometer 1. All simulated data described herein was generated using SIMION™ 8 ion trajectory modelling software.

FIG. 2*a* shows the simulated trajectories of ions in an ion pulse generated at the surface of the sample 10. The ion pulse has been generated by a laser pulse with duration around 5 ns which is focussed onto a 300 μm diameter laser spot on the sample 10. The laser spot is centred on the optical axis 2 of the mass spectrometer 1.

In the simulation of FIG. 2*a*, ions with initial energy 0.5 eV are emitted from the sample 10. Ions are emitted from the sample 10 in three directions, one parallel to the optical axis of the mass spectrometer, and one each at +/−30° to the optical axis. Ions emitted in each direction have an initial velocity as they leave the sample (also known as the "jet" velocity) of 350 meters per second and 650 meters per second.

FIG. 2*b* shows the simulated trajectories of the ions of FIG. 2*a* through an aperture in the extraction lens 20. The aperture of the extraction lens is 4 mm. The ratio of the extraction lens diameter to the laser spot diameter (300 μm) is at least 12:1. The ratio of the extraction lens diameter to the simulated diameter of the ion pulse through the extraction lens 20 is at least 7:1. Such large ratios between the extraction lens aperture and the diameter of the ion pulse is particularly good for producing an image with reduced astigmatism.

FIG. 2*c* shows the simulated trajectories of ions passing through the ion-optical lens 50. In this simulation, the ion-optical lens 50 is an einzel lens. The ion-optical lens 50 provides an electric field which focuses ions in the ion pulse, such that ions from each point on the sample 10 are focussed to a corresponding point on a linear detector (discussed below with reference to FIG. 3). In other words, the ion-optical lens 50 stigmatically focuses the ion beam onto a linear detector. The diameter of the aperture in the focussing lens 50 is 10 mm, which provides a ratio of at least 7:1 to the diameter of the ion pulse through it. Again, such a large ratio between the focussing lens aperture and the diameter of the ion pulse has been found to be particularly good for producing an image with low astigmatism.

Figure 3:
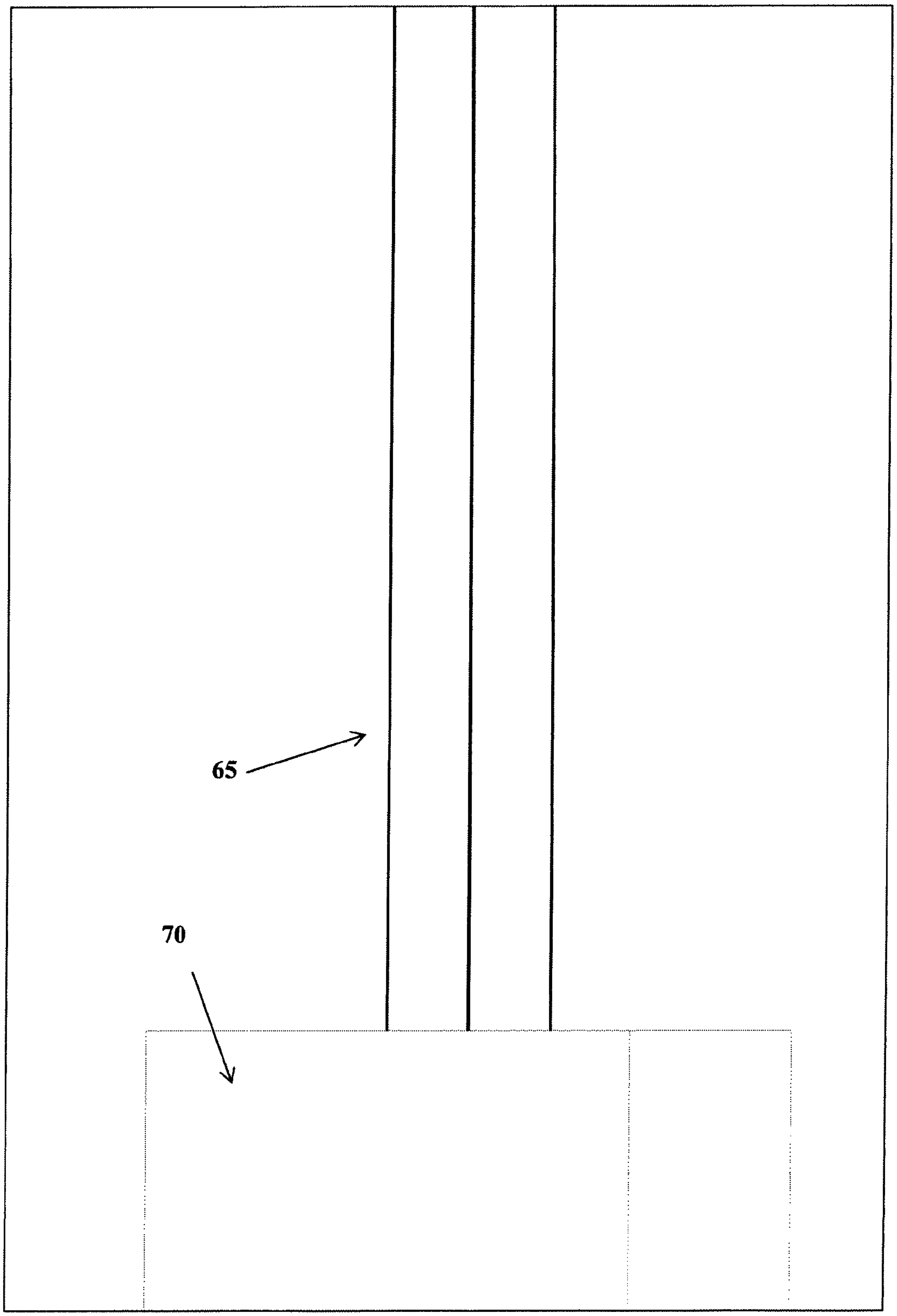
FIG. 3 shows the simulated trajectories of ions of mass to charge ratio 1800 Da incident on a linear detector in a TOF mass spectrometer.

FIG. 3 shows the simulated trajectories 65 of ions having a mass to charge ratio of 1800 Da incident on the linear detector 70 after being focussed by the ion-optical lens 50. By a "linear detector", it is meant a detector positioned on the ion-optical axis 2 of the mass spectrometer 1.

The linear detector 70 is a spatial detector having a plurality of "pixels" (locations on the linear detector 70 at which ions can be independently detected) so that the linear detector 70 is capable of forming an image from the ions which have been stigmatically focussed by the ion-optical lens 50. In this case, the linear detector 70 may be a delay line detector or a multiple anode detector.

In the simulation shown in FIG. 3, pulsed extraction of the ions from the sample 10 using extraction lens 20 was optimised for a mass to charge ratio of 1800 Da by the appropriate combination of pulsed extraction delay and field strength. The ion-optical lens 50 was optimised for spatial focussing of a mass to charge ratio of 1800 Da by applying a constant voltage of 5420V thereto. As can be seen from FIG. 3, the ions having a mass to charge ratio of 1800 Da are sharply focussed onto the linear detector 70 because both the pulsed extraction of the ions from the sample 1 and the focussing lens 30 were optimised for a mass to charge ratio of 1800 Da.

Figure 4:
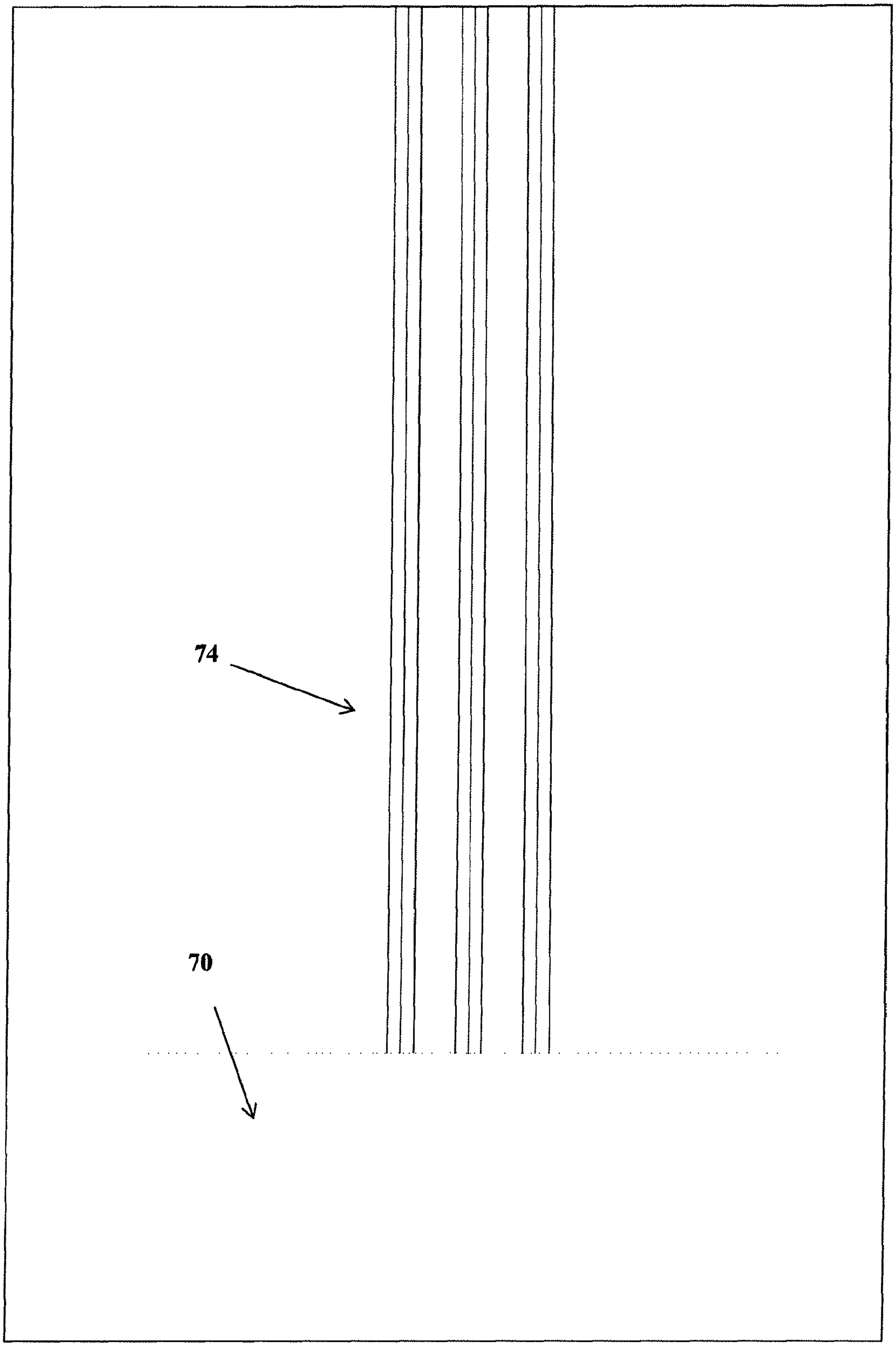
FIG. 4 shows the simulated trajectories of ions of mass to charge ratio 1050 Da incident on a linear detector in a TOF mass spectrometer.

FIG. 4 shows the simulated trajectories 74 of ions having a mass to charge ratio of 1050 Da incident on the linear detector 70 after being focussed by the ion-optical lens 50. As with the simulation shown in FIG. 3, the pulsed extraction of the ions from the sample 10 and the ion-optical lens 50 were optimised for a mass to charge ratio of 1800 Da. Again, the ion-optical lens 50 was optimised for a mass to charge ratio of 1800 Da by applying a constant voltage of 5420V thereto. Therefore the ions shown in FIG. 4 have a mass to charge ratio that is significantly different from the mass to charge ratio of 1800 Da for which the pulsed extraction from the sample 10 and the ion-optical lens 50 were optimised.

As illustrated by the simulated trajectories of FIG. 4, the ions having a mass to charge ratio of 1050 Da from each point on the sample have a spatial distribution on the linear detector 70 that is dependent on the angle at which the ions were desorbed (ejected) from the sample 10. In other words, the ion optic components of the mass spectrometer 1 are astigmatic for ions having a mass to charge ratio of 1050 Da and the resulting image from the linear detector 70 for these ions will therefore be blurred. The ion optic components of the mass spectrometer 1 would also be astigmatic for ions having a mass to charge ratio significantly higher than 1800 Da.

Previous attempts to reduce astigmatism in the focussing of an ion pulse were based on adjusting the pulsed extraction of ions. However, as can be seen from FIGS. 3 and 4, optimising the pulsed extraction for ions having one mass to charge ratio may not achieve a good stigmatic focus for ions having a significantly different mass to charge ratio.

The present inventors have found that it is possible to improve the focussing of ions having a particular mass to charge ratio, by optimising the electric field for the focussing of ions having that particular mass to charge ratio. In particular, the present inventors have found that the stigmatic focussing of ions can be improved by adjusting a voltage applied to the ion-optical lens 50 for ions of different mass to charge ratios.

In a TOF mass spectrometer, the time-of-flight of an ion in an ion pulse is dependent on mass to charge ratio of that ion. In particular, the time-of-flight of ions to an ion-optical lens (i.e. to the electric field provided by the lens) in a TOF mass spectrometer is dependent on mass to charge ratio.

Table 1 shows simulated data showing the time-of-flight to an ion-optical lens and the optimal focussing voltage for ions having different mass to charge ratios. The simulated data was generated for the mass spectrometer 1 having a pulsed extraction optimised for ions having mass to charge ratio 1800 Da. The "optimal focussing voltage" is the voltage which, when applied to the ion-optical lens 50, was found to give the best focus for ions having a given mass to charge ratio.

The time-of-flight values and optimal focussing voltages of Table 1 were calculated by simulation. However, the time-of-flight values could be calculated by other methods. For example, the voltages could be found by calibrating the mass spectrometer 1 (e.g. by adjusting a voltage applied to the ion-optical lens 50 whilst monitoring the appropriate sharpness of the image formed by the linear detector 70 for ions of a particular mass to charge ratio).

TABLE 1

Simulated data showing the time-of-flight to lens and the optimal focussing voltage for ions having different mass to charge ratios in a mass spectrometer whose pulsed extraction is optimised for ions having mass to charge ratio 1800

| Mass to charge ratio | Time-of-flight to focussing lens (ns) | Optimal focussing voltage (V) |
|---|---|---|
| 1050 | 3600 | 5200 |
| 1250 | 3926 | 5280 |
| 1450 | 4227 | 5340 |
| 1650 | 4508 | 5390 |
| 1850 | 4772 | 5440 |
| 2050 | 5023 | 5480 |
| 2250 | 5261 | 5510 |
| 2450 | 5489 | 5540 |

FIG. 5*a* is a graph comparing optimal focussing voltage (V) ("stigmatic lens potential") with the mass to charge ratio of ions. The graph shown in FIG. 5*a* was produced using the data shown in Table 1. A calculated dependence of optimal stigmatic focussing voltage on mass to charge ratio is shown by a solid line.

FIG. 5*b* is a graph comparing optimal focussing voltage (V) ("stigmatic lens potential") with the time-of-flight to lens ("TOF to lens") of ions. The graph shown in FIG. 5*b* was produced using the data shown in Table 1. A calculated dependence of optimal stigmatic focussing voltage on the time-of-flight to lens is shown by a solid line.

As can be seen from Table 1 and FIGS. 5*a* and 5*b*, both the time of flight and the optimal stigmatic focussing voltage of ions increase with the mass to charge ratios of ions. Therefore, ions passing through the lens at a later time will have a larger mass to charge ratio and will require a larger voltage to be applied to the ion-optical lens 50 in order to achieve optimal focussing (i.e. reduced astigmatism).

FIG. 6 shows a voltage waveform for applying to the ion-optical lens 50 as the ion pulse passes through the ion-optical lens 50. The voltage waveform shown in FIG. 6 was calculated using the values given in Table 1, so that the voltage applied to the ion-optical lens 50 would be optimised so as to stigmatically focus ions having different mass to charge ratios as they pass through the lens at different times.

The calculated waveform for applying to the ion-optical lens 50 is shown in FIG. 6. The calculated waveform is a simple ramp, i.e. a linearly increasing voltage waveform. The waveform starts with a DC voltage of 5200V at a time of 3.5μs (i.e. 3.5 μs after the ion pulse is generated at the sample). The DC voltage then ramps up to 5550V over a period of 2 μs (at a linearly increasing rate of 175 V/μs).

FIG. 7 shows the simulated trajectories 76 of ions having a mass to charge ratio of 1050 Da incident on the detector 70 after being focussed by the ion-optical lens 50. As with the simulated trajectories shown in FIG. 4, the pulsed extraction of the ions from the sample 10 was optimised for a mass to charge ratio of 1800 Da. However, in this case the voltage waveform shown in FIG. 6 was applied to the ion-optical lens 50. As can be seen from FIG. 7, because the voltage waveform of FIG. 6 is arranged to be a voltage appropriate for focussing each ion in the ion pulse as the ion pulse passes through the ion-optical lens 50, a good focus of the ions of mass to charge ratio of 1050 Da is achieved (i.e. reduced astigmatism and therefore reduced blurring). Compare this with the simulated data shown in FIG. 4 in which a good focus was not achieved for ions of mass to charge ratio 1050 (because the voltage applied to the ion-optical lens 50 was constant and therefore only optimised for ions of mass to charge ratio 1800 Da).

The voltage waveform shown in FIG. 6 is a simple ramp. However, a voltage waveform could be calculated to more accurately reflect the data shown in Table 1 (e.g. it could be a non-linear waveform). This could improve the focussing of ions by the ion-optical lens 50 yet further.

FIG. 8 shows a voltage waveform generator 31*a* for applying a voltage waveform to the ion-optical lens 50. The voltage waveform generator 31*a* includes a digital to analogue converter 32, an amplifier 34, a high voltage capacitor 36 and a high voltage DC power supply unit 38. The digital to analogue converter 32 and amplifier 34 are AC coupled to the high voltage DC power supply unit 38 (5.2 kV) by the high voltage capacitor 36. The digital to analogue converter 32 generates a low (intermediate) voltage waveform (0 to 3.5V in 2 μs) which is amplified by the amplifier 34 (by a factor of 100) and then added to the output of the high voltage power supply 38 so that the voltage waveform of FIG. 6 is generated.

FIG. 9 shows another voltage waveform generator 31*b* for applying a voltage waveform to the ion-optical lens 50. In the waveform generator 31*b*, a DAC 32 is used to produce a low (intermediate) voltage waveform (2.6V to 2.775V in 2 μs) that is then amplified by a high voltage amplifier 35 (by a factor of 2000) to produce the voltage waveform of FIG. 6.

The mass spectrometer may include a reflectron. A reflectron is an ion mirror that reflects the ions in an ion pulse back toward the ion source to a reflectron detector (a detector located to detect reflected ions). One advantage of using a reflectron is that it produces higher mass resolution than using a linear detector (and therefore better mass accuracy), albeit with a lower maximum mass range.

A reflectron can also be used for a TOF MS/MS mass spectrometer. An TOF MS/MS mass spectrometer includes a fragmentation region for fragmenting ions in an ion pulse (e.g. by meta-stable decay of the ions or by collision induced fragmentation).

FIGS. 10, 11, 12 and 13 show the simulated trajectories of ions where the mass spectrometer 1 includes a reflectron 60 and a reflectron detector 80. The reflectron includes reflectron deflectors 65 and a reflectron front plate 90. The reflectron detector 80 is located to detect the ions reflected by the reflectron. The reflectron detector 80 is a spatial detector. The ion-optical lens 50 is located before the reflectron 60.

FIG. 10 shows the simulated trajectories 78 of ions of mass to charge ratio 1800 Da which are reflected by the reflectron and hit the reflectron detector 80. As with the simulations of FIGS. 3 and 4, the pulsed extraction of the ions from the sample 10 and the ion-optical lens 50 were optimised for a mass to charge ratio of 1800 Da. The ion-optical lens 50 was optimised for a mass to charge ratio of 1800 Da by applying a constant voltage of 5750V thereto. As can be seen from FIG. 10, the ions having a mass to charge ratio of 1800 Da are sharply focussed onto the reflectron detector 80.

FIG. 11 shows the simulated trajectories 81 of ions of mass to charge ratio 1050 Da which are reflected by the reflectron and hit the reflectron detector 80. As with the simulations of FIG. 10, the pulsed extraction of the ions from the sample 10 and the ion-optical lens 50 were optimised for a mass to charge ratio of 1800 Da. The ion-optical lens 50 was optimised for a mass to charge ratio of 1800 Da by applying a constant voltage of 5750V thereto. As can be seen from FIG. 11, the ions having a mass to charge ratio of 1050 Da are not well focussed (because the ion-optical lens 50 is not optimised for a mass to charge ratio of 1050 Da).

FIG. 12 shows the simulated trajectories 82 of ions of mass to charge ratio 1050 which are reflected by the reflectron and hit the reflectron detector 80. As with the simulations of FIGS. 10 and 11, the pulsed extraction of the ions from the sample 10 was optimised for a mass to charge ratio of 1800. However, in this simulation, the voltage waveform similar to that (but with different voltages) shown in FIG. 6 was applied to the ion-optical lens 50.

In the simulation of FIG. 12, a good focussing of the ions of mass to charge ratio of 1050 Da is achieved (i.e. reduced astigmatism and therefore reduced blurring), because the voltage waveform of FIG. 6 is arranged to be a voltage appropriate for focussing each ion in an ion pulse as the ion pulse passes through the ion-optical lens 50. Compare the good focussing of ions in the simulation of FIG. 12 with the simulation shown in FIG. 11 in which a good focus was not achieved for ions of mass to charge ratio 1050 Da (because the voltage applied to the ion-optical lens was constant and only optimised for ions of mass to charge ratio 1800 Da).

FIG. 13 shows the simulated trajectories 84 of fragmented ions of mass to charge ratio 525 Da incident on a spatial detector 80 in a TOF mass spectrometer. In this simulation, the ions having mass to charge ratio of 525 are fragment ions produced by the ions of the simulation of FIG. 12 (having mass to charge ratio 1050 Da) undergoing dissociation before the reflectron. Therefore, FIG. 13 depicts an MS/MS experiment. In this simulation, a voltage of 5600V was applied to the ion-optical lens 50 such that a good focus of the fragment ions was achieved.

FIGS. 14*a*, 14*b* and 14*c* show schematically the location of the ion-optical lens with respect to the ion source and detector in a number of embodiments of the present invention.

FIG. 14*a* shows a linear TOF-MS spectrometer 100 comprising a pulsed ion source 102 and spatial detector 104. Spaced from the ion source 102 is ion-optical lens 106 (the "stigmatic lens"), which is connected to electric field adjusting means 108. Electric field adjusting means 108 comprises a voltage waveform generator for applying a voltage waveform to the ion-optical lens 106 while an ion pulse passes through the ion-optical lens 106.

FIG. 14*b* shows a reflectron TOF-MS 120 comprising the same ion source 102, ion-optical lens 106, spatial detector 104 and electric field adjusting means 108 as the TOF-MS of FIG. 14*a*. In addition, there is a reflectron 122.

FIG. 14*c* shows a reflectron TOF-MS/MS spectrometer 140. It comprises the same components as the reflectron TOF-MS of FIG. 14*b* except that in addition there is a fragmentation region 142 wherein parent ions can be fragmented. The ion-optical lens 106 is located between the ion source 102 and the fragmentation region 142.

One of ordinary skill after reading the foregoing description will be able to affect various changes, alterations, and subtractions of equivalents without departing from the broad concepts disclosed. It is therefore intended that the scope of the patent granted hereon be limited only by the appended claims, as interpreted with reference to the description and drawings, and not by limitation of the embodiments described herein.

I claim:

1. A TOF mass spectrometer having:

a pulsed extraction ion source for generating an ion pulse from a sample;

a spatial detector for detecting ions in the ion pulse and the position at which the ions hit the detector; and an ion-optical lens located between the ion source and the spatial detector for providing an electric field to focus ions in the ion pulse as they pass through the electric field;

wherein the TOF mass spectrometer includes an electric field adjusting means for adjusting the electric field as the ion pulse passes through the electric field in order to spatially focus ions of different mass and thereby reduce astigmatism.

2. A TOF mass spectrometer according to claim 1 wherein the spatial detector is a delay line detector or has multiple anodes.

3. A TOF mass spectrometer according to claim 1 wherein the electric field adjusting means includes a voltage waveform generator for applying a voltage waveform to the ion-optical lens as the ion pulse passes through the electric field provided by the ion-optical lens.

4. A TOF mass spectrometer according to claim 3 wherein the mass spectrometer includes a control means for controlling the voltage waveform generator, which control means optionally has means for increasing the voltage applied to the ion-optical lens by the voltage waveform generator as the ion pulse passes through the electric field, and/or means for controlling the voltage waveform generator to apply any one or more of a linear waveform, an exponential waveform, a stepped waveform or an oscillating waveform to the ion-optical lens.

5. A TOF mass spectrometer according to claim 4 wherein the control means includes a memory for storing a voltage waveform to be applied to the ion-optical lens by the voltage waveform generator and/or calculating means for calculating a voltage waveform to be applied to the ion-optical lens by the voltage waveform generator.

6. A TOF mass spectrometer according to claim 4 wherein the control means is coupled to the ion source so that control of the voltage waveform is dependent at least in part on one or more properties of the ion source.

7. A TOF mass spectrometer according to claim 1 wherein the spectrometer comprises an ion optic component having an aperture for the ion pulse to pass through, the ratio of the width of the aperture to the width of the ion pulse when the mass spectrometer is in use being at least 5:1.

8. A TOF mass spectrometer according to claim 1 wherein the electric field adjusting means has means for adjusting the strength and/or shape of the electric field provided by the ion-optical lens as the ion pulse passes through the electric field.

9. A TOF mass spectrometer according to claim 1 wherein the ion-optical lens is an einzel lens; the ion source is selected from laser desorption (no matrix), MALDI and SIMS (secondary ion mass spectrometry) ion sources; and the mass spectrometer includes a reflectron.

10. A TOF mass spectrometer according to claim 1 wherein the TOF mass spectrometer is a TOF MS/MS mass spectrometer.

11. A TOF mass spectrometer according to claim 1 wherein the electric field adjusting means is arranged to adjust the electric field provided by the ion-optical lens during a period of less than 1 second.

12. A method of spatially focussing an ion pulse in a TOF mass spectrometer, the method including:

generating an ion pulse from a sample;

providing an electric field to spatially focus the ion pulse; and detecting the ion pulse focussed by the electric field, wherein the electric field is adjusted as the ion pulse passes through the electric field in order to spatially focus ions of different mass and thereby reduce astigmatism.

13. A method according to claim 12, wherein the method includes the step of generating an image of the sample.

14. A method according to claim 12 wherein the electric field is provided by an ion-optical lens and is adjusted by applying a voltage waveform to the ion-optical lens as the ion pulse passes through the electric field; such that the voltage applied to the ion-optical lens is increased as the ion pulse passes through the electric field.

15. A method according to claim 12 wherein the electric field is adjusted during a period of less than 1 second.

16. A TOF mass spectrometer having:

a pulsed extraction ion source for generating an ion pulse from a sample;

an ion-optical lens for focussing the ion pulse as the ion pulse passes through the ion-optical lens;

a spatial detector for detecting ions focussed by the ion-optical lens and measuring the position at which the ions hit the detector; and a voltage waveform generator for applying a voltage waveform to the ion-optical lens as the ion pulse passes through the ion-optical lens in order to spatially focus ions of different mass and thereby reduce astigmatism.

17. An electric field adjusting means for use with an ion-optical lens in a TOF mass spectrometer according to claim 1, said electric field adjusting means being configured to adjust the electric field provided by the ion-optical lens as an ion pulse passes through the ion-optical lens.

18. A method of modifying a TOF mass spectrometer to be a mass spectrometer according to claim 1, comprising the step of installing the electric field adjusting means such that it is configured to adjust the electric field provided by the ion-optical lens as an ion pulse passes through the ion-optical lens.

19. A method of calibrating a TOF mass spectrometer which includes identifying a voltage waveform to be applied to an ion-optical lens of the mass spectrometer as an ion pulse passes through the ion-optical lens to spatially focus ions in the ion pulse and thereby reduce astigmatism.

* * * * *